United States Patent [19]
Ohsuga et al.

[11] Patent Number: 5,084,821
[45] Date of Patent: Jan. 28, 1992

[54] APPARATUS FOR DETERMINING CONTROL CHARACTERISTICS FOR AUTOMOBILES AND SYSTEM THEREFOR

[75] Inventors: Minoru Ohsuga, Katsuta; Toshimichi Minowa, Ibaraki; Junichi Ishii, Katsuta; Nobuo Kurihara, Hitachiota, all of Japan

[73] Assignee: Hitachi, Ltd., Tokyo, Japan

[21] Appl. No.: 413,630

[22] Filed: Sep. 28, 1989

[30] Foreign Application Priority Data

Oct. 5, 1988 [JP] Japan .................. 63-249866

[51] Int. Cl.$^5$ .................................. G06F 15/20
[52] U.S. Cl. ..................... 364/424.05; 364/431.03; 364/426.01
[58] Field of Search ............ 364/424.05, 431.04, 364/431.03; 307/10.2, 10.5; 340/825.31, 325.34; 235/431.12, 487

[56] References Cited

U.S. PATENT DOCUMENTS

| | | | |
|---|---|---|---|
| 4,267,494 | 5/1981 | Matsuoka et al. | 364/424.05 |
| 4,477,874 | 10/1984 | Ikuta et al. | 364/424.05 |
| 4,731,769 | 3/1988 | Schaefer et al. | 364/424.05 |
| 4,798,322 | 1/1989 | Berastein et al. | 235/487 |
| 4,809,199 | 2/1989 | Burgess et al. | 307/10.5 |

FOREIGN PATENT DOCUMENTS 59-57037A 4/1984 Japan .

Primary Examiner—Thomas G. Black
Attorney, Agent, or Firm—Antonelli, Terry, Stout & Kraus

[57] ABSTRACT

A control device for an automobile capable of changing the relationship between the driver's input and the controlled variable of the automobile by the driver's individual characteristics so as to characterize the automobile.

20 Claims, 26 Drawing Sheets

FIG. 13
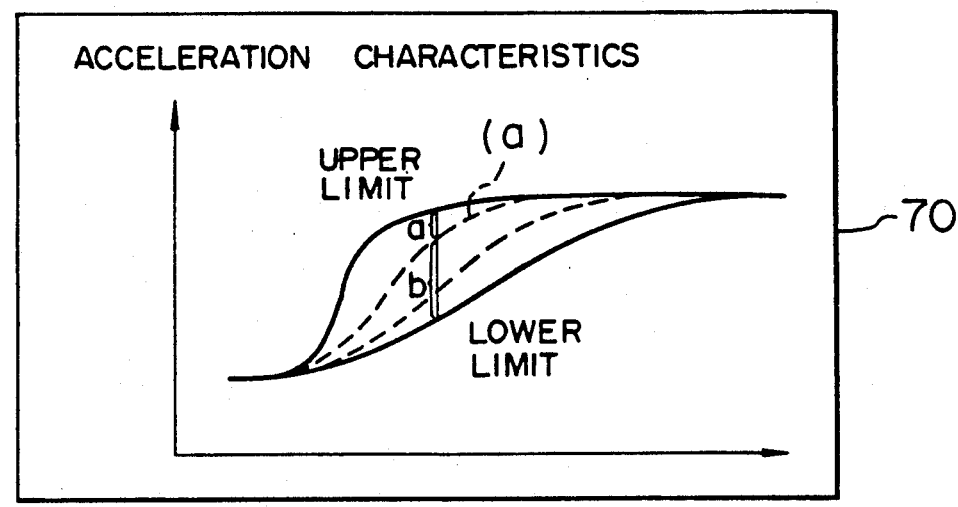
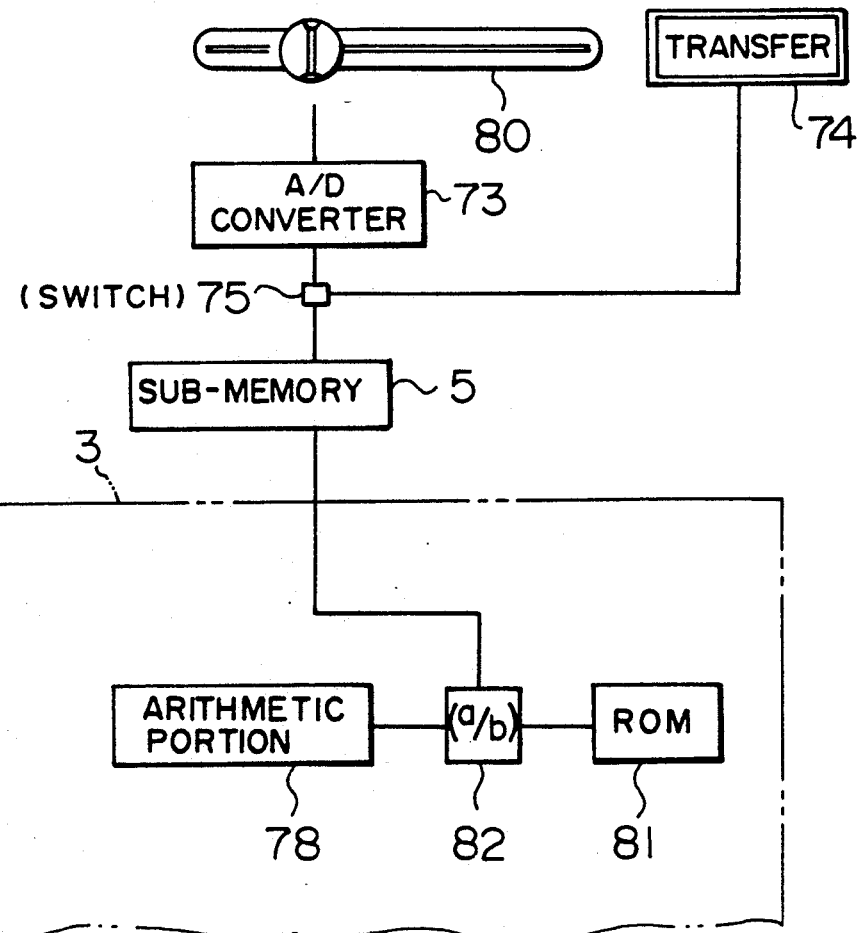

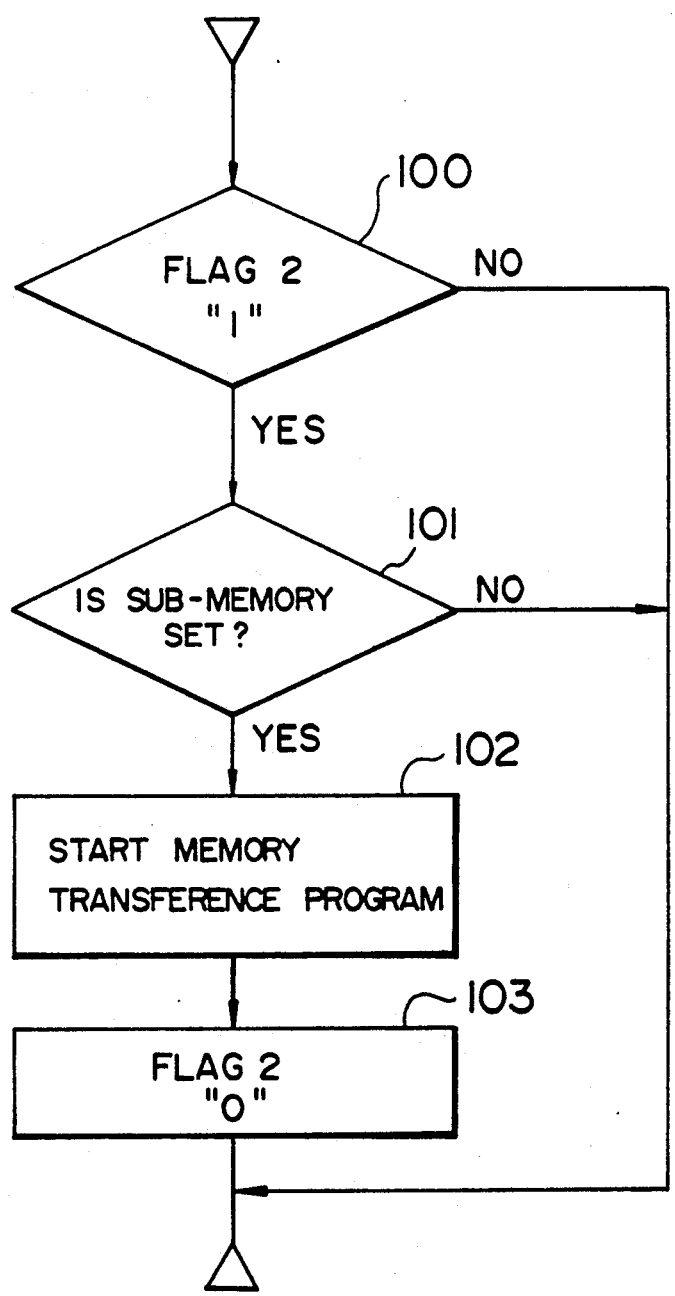

(BRAKING PORTION)   (BRAKING PORTION)

FIG. 38

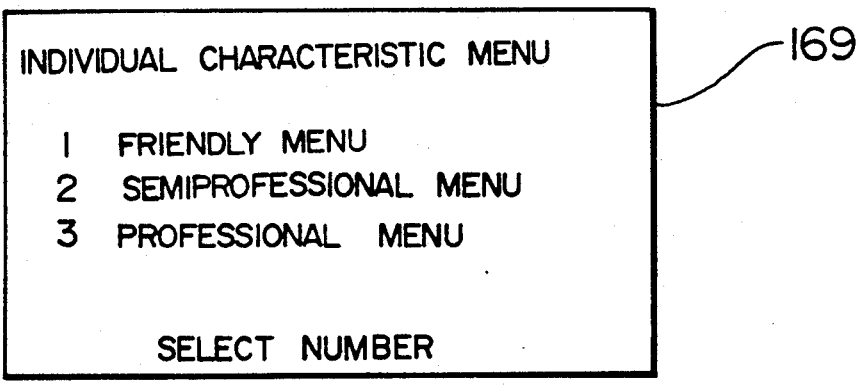

INDIVIDUAL CHARACTERISTIC MENU

1 FRIENDLY MENU
2 SEMIPROFESSIONAL MENU
3 PROFESSIONAL MENU

SELECT NUMBER

FIG. 39

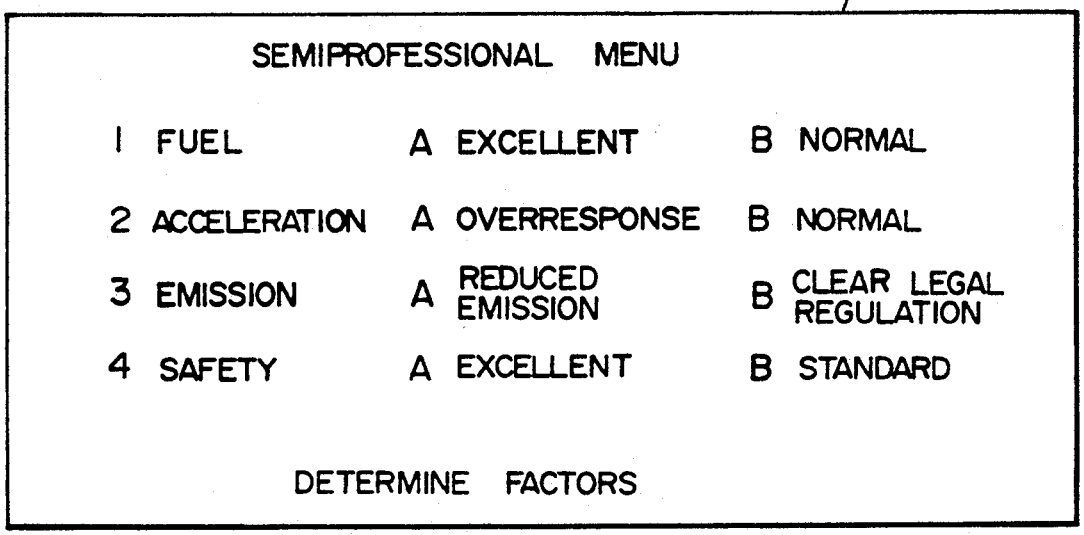

SEMIPROFESSIONAL MENU

| 1 FUEL | A EXCELLENT | B NORMAL |
| 2 ACCELERATION | A OVERRESPONSE | B NORMAL |
| 3 EMISSION | A REDUCED EMISSION | B CLEAR LEGAL REGULATION |
| 4 SAFETY | A EXCELLENT | B STANDARD |

DETERMINE FACTORS

FIG. 40

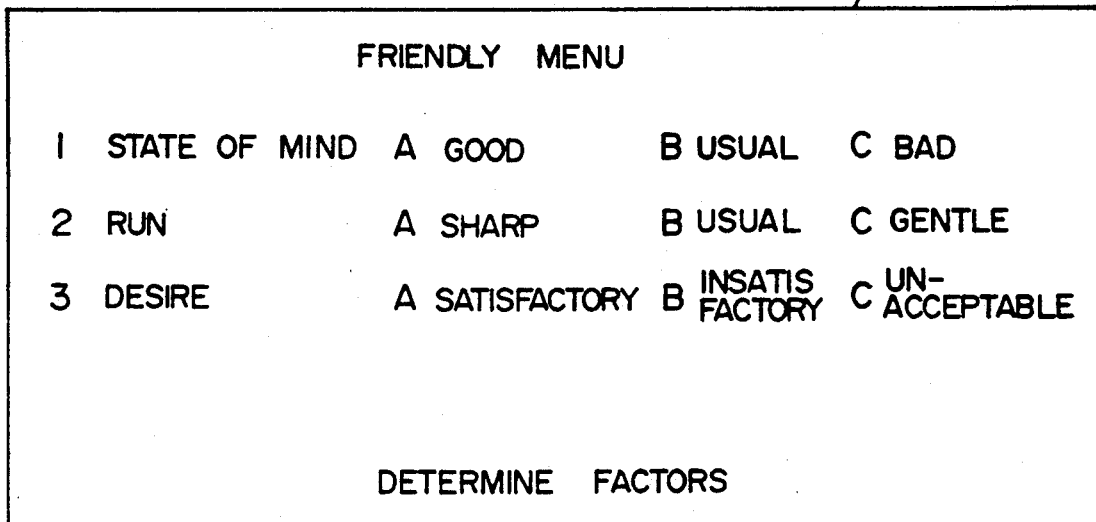

FRIENDLY MENU

| 1 STATE OF MIND | A GOOD | B USUAL | C BAD |
| 2 RUN | A SHARP | B USUAL | C GENTLE |
| 3 DESIRE | A SATISFACTORY | B INSATIS FACTORY | C UN-ACCEPTABLE |

DETERMINE FACTORS

APPARATUS FOR DETERMINING CONTROL CHARACTERISTICS FOR AUTOMOBILES AND SYSTEM THEREFOR

BACKGROUND OF THE INVENTION

1. Field of the Invention

The present invention relates to a control apparatus for an automobile, and, more particularly, to a system capable of preferably varying the response (controlled variable) of the operation of an automobile in accordance with the individual input of each of a number of drivers.

2. Description of the Related Art

A method of selecting various parameters for devices of an automobile in accordance with the individual input of each of various drivers has been disclosed in Japanese Patent Unexamined Publication No. 59-57037, the method being characterized in that the position of the driver's seat is shifted by a motor in accordance with the contents of the memory. Another method has been disclosed in Japanese Patent Unexamined Publication No. 59-48208 in which the height of the vehicle can be changed by a manual lever.

The former conventional method is characterized in that only the controlled parameter (the seat position) is changed in accordance with the contents of the memory, but there is no suggestion for correction of a controlled variable used in controlling vehicle operation in accordance with an input conducted by the driver's operation is performed corresponding to the contents of the memory.

In the latter conventional method, the controlled parameter (the vehicle height) is changed by using a manual lever. However, there is no suggestion about the structure with which the vehicle height is changed in accordance with the contents of a memory corresponding to characteristics of each of the drivers.

SUMMARY OF THE INVENTION

An object of the present invention is to provide an apparatus for determining control characteristics for controlling the operation of an automobile, the apparatus being capable of correcting a controlled variable in accordance with an input by the driver on the basis of the contents of a individual memory storing an operating characteristic for each of the drivers.

The above-described object can be achieved by a structure in which the correction of the controlled variable with respect to the input from the driver is determined by means of a device for inputting the individual characteristics for each of the drivers and the thus determined correction is stored in an individual memory for each of the drivers so that the controlled variable is corrected by using the thus stored correction when the operation of the automobile is controlled. This memory may be integrally provided with the control unit for controlling the operation of the automobile, or may be provided as a peripheral equipment.

The characteristics input apparatus according to the present invention is capable of inputting a characteristic selected by a driver into a memory corresponding to the respective drivers. The contents stored in the memory is transferred to a memory device disposed in the control unit for the automobile at a predetermined timing. The control unit for an automobile corrects the control variable with respect to the input in accordance with the thus transferred contents.

As a result of the above-described operation, the controlled variable for controlling operation of the automobile can be determined in accordance with the characteristics desired by each of the drivers.

BRIEF DESCRIPTION OF THE DRAWINGS

FIGS. 12 and 13 are bock diagrams which illustrate another embodiment of the present invention;

FIGS. 14 and 15 are flow charts;

FIGS. 38 to 42 are views which illustrate format display; and

DESCRIPTION OF THE PREFERRED EMBODIMENTS

Figure 1:
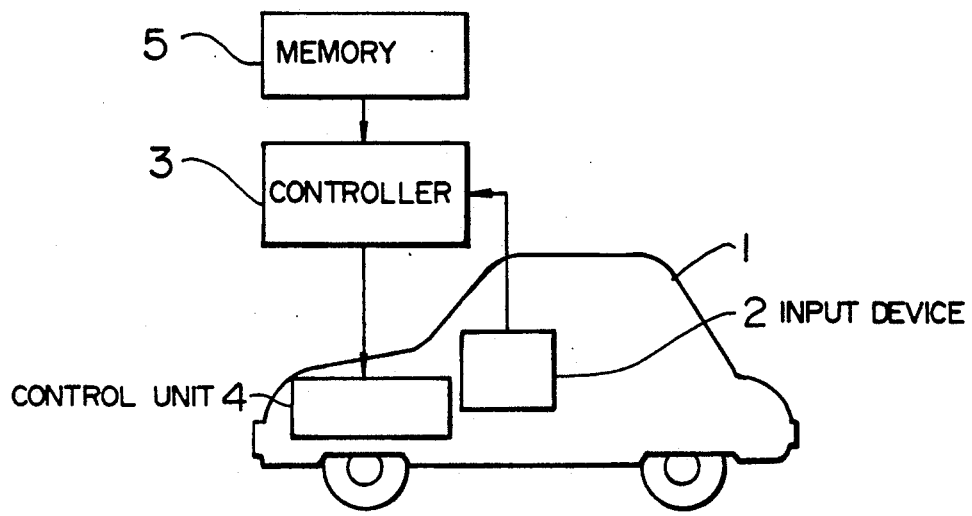
FIG. 1 is a view which illustrates the basic structure of the present invention.

An embodiment of the present invention will now be described with reference to FIG. 1.

Reference numeral 1 represents an automobile. Reference numeral 2 represents an input device arranged to be operated by a driver, the input device 2 being, for example, an accelerator, a steering wheel, a brake pedal, a change gear lever, or a clutch pedal. The signal representing the degree of operation of the input device is arranged to be input to a controller 3. The controller 3 determines the controlled variable in accordance with the degree of operation, so that the thus determined controlled variable is transmitted to a control unit 4, such as the vehicle engine, braking system, automatic transmission and the like. According to the present invention, the relationship between the degree of operation and the controlled variable is corrected in accordance with the contents of a memory 5, which provides an operating characteristic for each of the drivers The memory 5 which corresponds to each of the drivers comprises, for example, an IC card, CD (Compact Disk), MT (Magnet Tape), and DAT (Digital Audio Tape). Furthermore, it is arranged that the contents of the memory 5 can be determined to be an individual value for each of the drivers. That is, response characteristics of the automobile with respect to the degree of operation can be determined by a driver or a car dealer so that the automobile is able to have preferred characteristics or a preferred performance which matches the driver. That is, the characteristics of the automobile can be adjusted to meet the driver's desire. Furthermore, since the thus adjusted characteristics and performance are stored in the memory 5, they can be readily reproduced.

Figure 2:
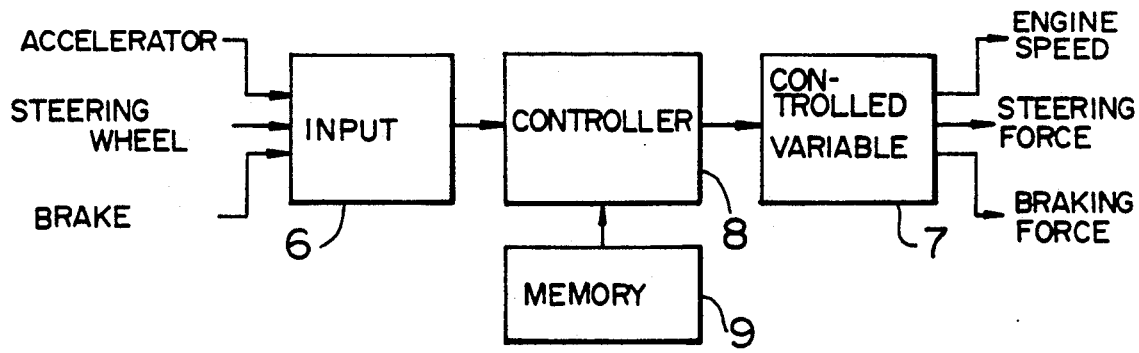
FIG. 2 is a view which illustrates the basic block diagram of the present invention.

FIG. 2 is a block diagram which illustrates the elements of the present invention. A block 6 represents an input, a block 7 represents controlled variable, a block 8 represents a controller capable of correcting the relationship between the input and the controlled variable, and a block 9 represents a memory in which a parameter corresponding to each of the drivers is stored. Although a memory is provided in the conventional apparatus, it stores simply the controlled variable and does not store a coefficient for correction of the characteristics with respect to the input for an individual driver. Furthermore, when the control variable is manually changed in a manner according to the conventional technology, the correction during the change is not calculated, or the correction is not changed to meet the desire of the driver if the correction is calculated.

The present invention is characterized in that the parameter for the calculation of the correction is optionally determined by a driver and the thus determined parameter is stored in the individual memory 9 provided for each of the drivers.

It is assumed that the input 6 is the degree of the movement of the accelerator pedal and the controlled variable 7 is the engine speed. Fuel in an amount which corresponds to the degree of movement of the accelerator pedal is supplied to the engine so that the engine speed is changed. Therefore, it is necessary for the characteristics about the amount of fuel which corresponds to the degree of movement of the accelerator pedal to be changed by using a correction coefficient in order to obtain the individual characteristics for each of the drivers. The coefficient is stored in the memory 9 for each of the drivers so that the thus corrected characteristics are used to control the automobile when the automobile is driven.

Another structure may be employed which is characterized in that the relationship between the force to operate the steering wheel and the force with which the tire is steered is changed by using the parameter stored in the memory 9.

Furthermore, the relationship between the amount of movement of the brake pedal and the braking force can be determined in the memory 9 by using the individual parameter for each of the drivers.

Figure 3:
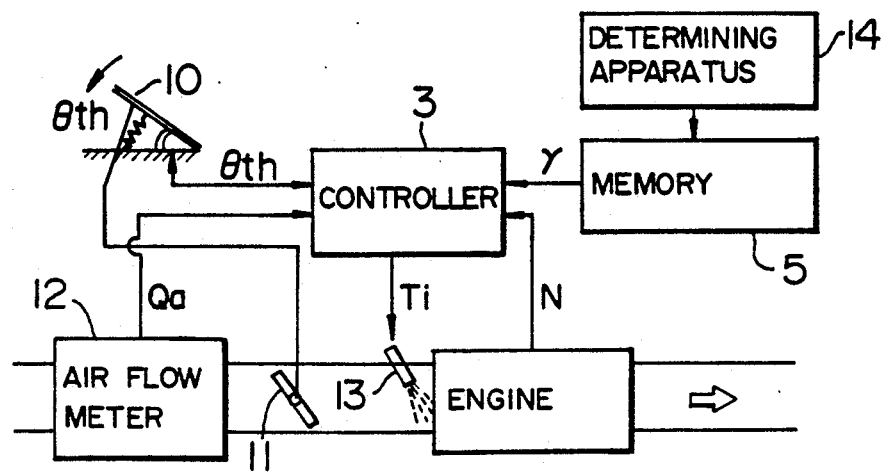
FIG. 3 is a block diagram which illustrates an embodiment of the present invention.

FIG. 3 is a view which illustrates an embodiment in which the movement of the accelerator pedal is arranged to be the input, while the corresponding engine speed is arranged to be the controlled variable. According to this embodiment, a throttle valve 11 is operated in synchronization with the operation of the accelerator pedal 10. The accelerator pedal movement $\theta$th is arranged to be input to the controller 3 during a time period in which an injection valve 13 is opened and this value is determined from the following Equation (1) by using the quantity $Q_a$ of air which is detected by an air flow meter 12 and the engine speed N, the time Ti period in which the injection valve is opened corresponding to the quantity of fuel:

$$Ti = \frac{Q_a}{N}(1 + \beta \cdot \gamma) \quad (1)$$

where
$\beta$: the correction such as air/fuel ratio or temperature of water
$\gamma$: the individual correction for each of the drivers In the conventional apparatus, the following Equation (2) in which no correction with $\gamma$ is used:

$$Ti = \frac{Q_a}{N}(1 + \beta) \quad (2)$$

According to the present invention, a novel correction $\gamma$ is, as expressed by Equation (1), arranged to be used as the individual correction parameter for each of the drivers. The characteristics of the thus arranged novel correction parameter $\gamma$ are stored in the memory 5. Furthermore, a determining apparatus 14 with which the correction parameter $\gamma$ can be determined by the driver is provided for the apparatus according to this embodiment. This memory 5 may alternatively be disposed in the controller 3.

Figure 4:
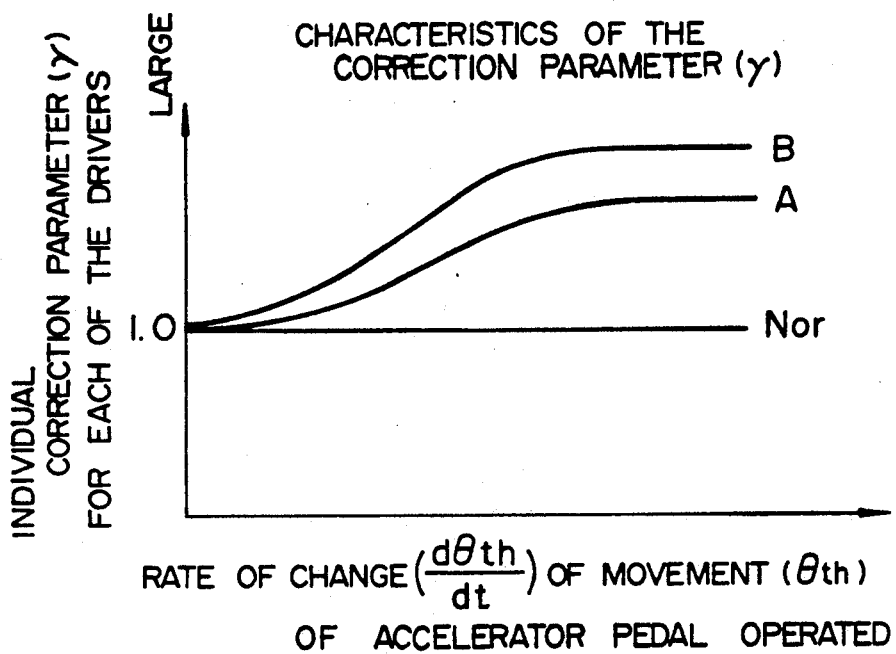
FIG. 4 is a characteristics drawing.

Then, the characteristics of the correction parameter $\gamma$ are shown in FIG. 4. The abscissa provides values of the rate of change $d\theta$th/dt of the movement $\theta$th of the accelerator pedal operated, while the ordinate indicates the value of the correction parameter $\gamma$. FIG. 4 is a view which illustrates the characteristics of three variations of the correction parameters $\gamma$. The normal ($N_{or}$) characteristic always has $\gamma = 1$ so that the characteristics becomes as expressed by Equation (2). Characteristic A provides values of correction in which $\gamma$ increases in accordance with the enlargement of $d\theta$th/dt. That is, when the accelerator pedal is rapidly and by a large degree moved, $\gamma$ increases, causing the time Ti to increase. This means that fuel has been increased rapidly, causing the first transition of the engine speed to become faster. Furthermore, characteristic B provides values of correction in which $\gamma$ is greater than that of characteristic A, causing the further improved first transition of the engine speed. The characteristic selected by a driver for values $\gamma$ or a selector for selecting this characteristic are stored in the memory 5 shown in FIG. 3.

Figure 5:
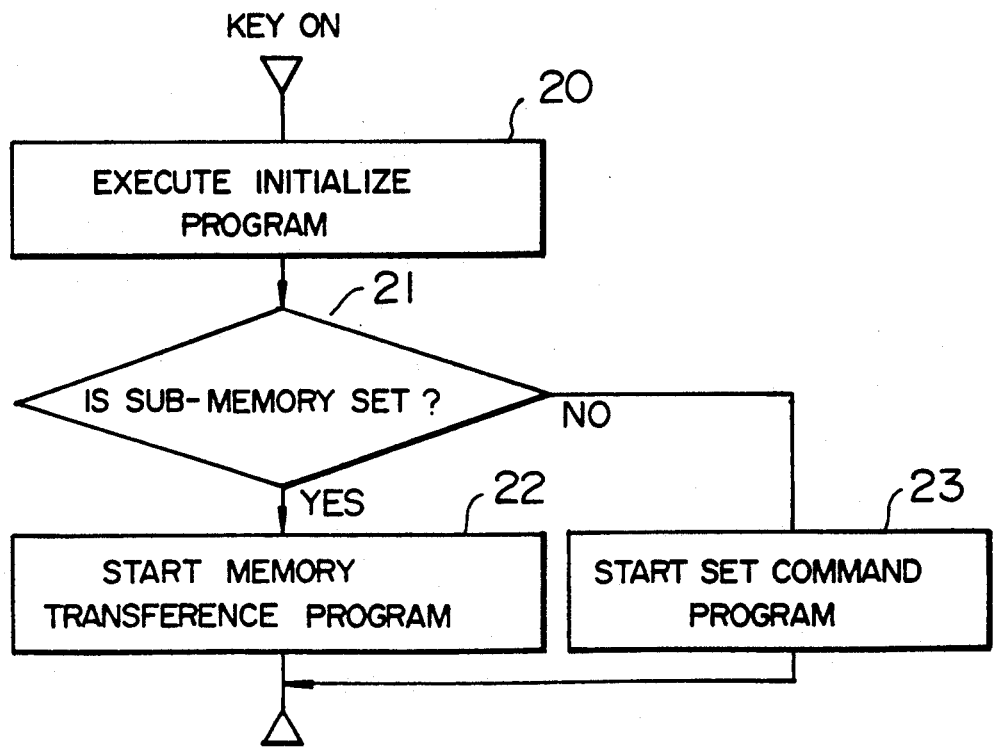
FIGS. 5 to 10 are flow charts.

A flow chart which illustrates the operation performed in the controller 3 of the apparatus shown in FIG. 3 is described. FIG. 5 is a flow chart which illustrates the first flow after the key switch has been switched on. After the key switch has been switched on, a initializing program is executed in Step 20, the initializing program setting a constant or the like which is necessary for conducting control. A timer for scheduling the ensuing control is also set.

Figure 6:
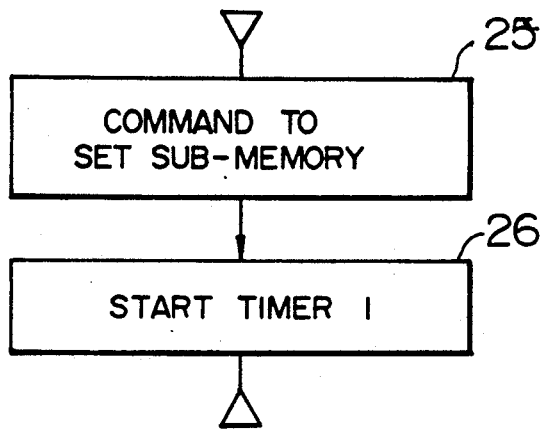
Figure 7:
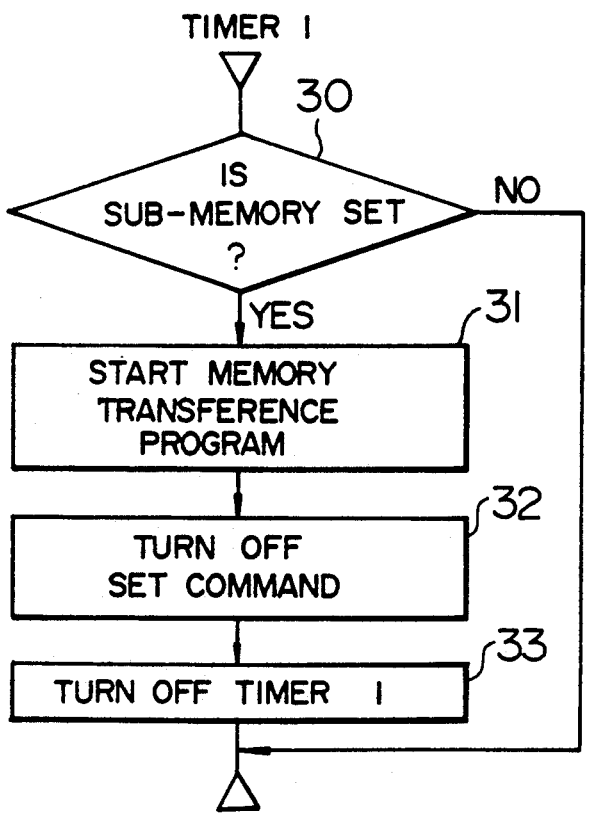

In Step 21, whether or not a sub-memory (which corresponds to the memory 5 shown in FIG. 3) has been set is determined. If it is determined that the sub-memory has been set, a program capable of transferring the contents stored in the sub-memory into the controller 3 is started in Step 22. On the other hand, if it is determined in Step 21 that the sub-memory has not been set, a set command program is started in Step 23. FIG. 6 is a view which illustrates a set command program for a sub-memory to be started in Step 23. When this program is started, an instruction to set the sub-memory is made with a display or voice in Step 25. Then, a timer 1 having a predetermined interval is started in Step 26. FIG. 7 is a view which illustrates a program to be executed when the timer 1 is started. In Step 30, whether the sub-memory has been set or not is determined. If it is determined that the sub-memory has been set, a memory transferring program is started in Step 31. Then, in Step 32, the instruction to set the memory is turned off in Step 32, and then the timer 1 is turned off in Step 33.

If it is determined that the sub-memory has not been set in Step 30, the starting program by means of the timer 1 is completed. Since the timer 1 is started again after a predetermined time has elapsed, the flow from Step 30 is repeated until the sub-memory is set.

Figure 8:
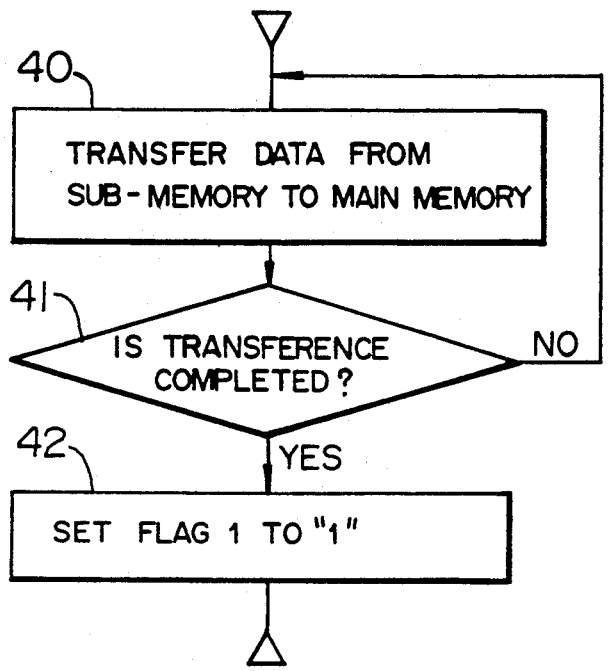
Figure 9:
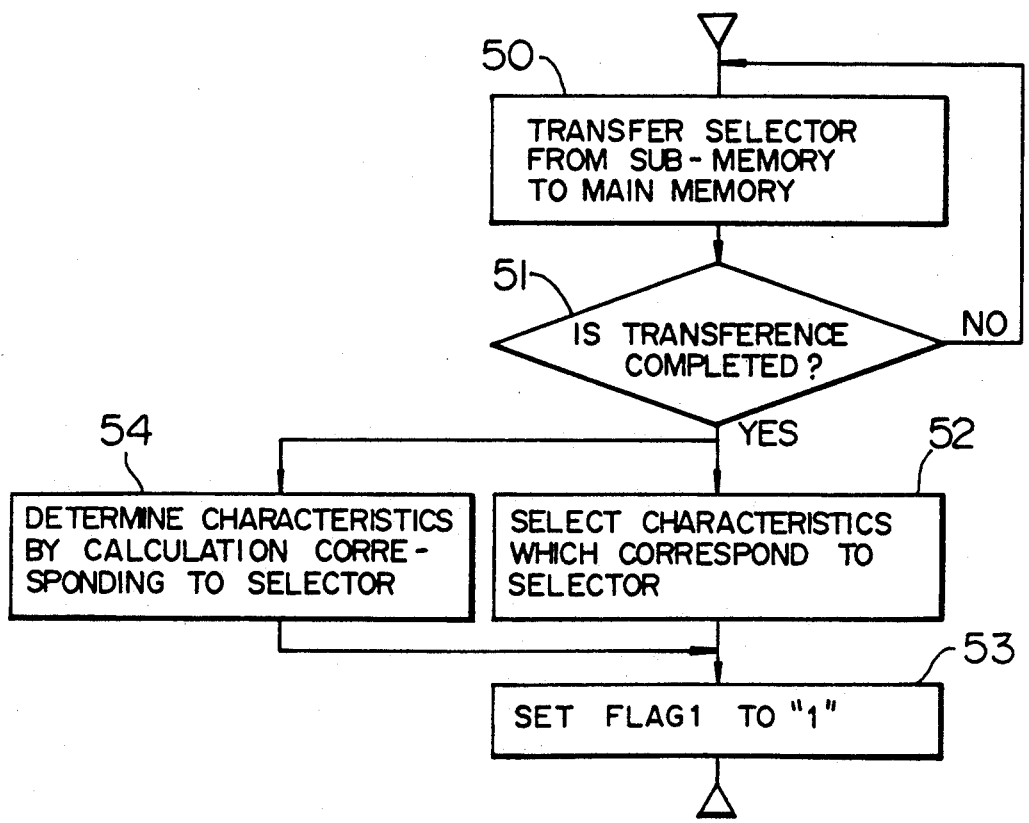

As a result of the operations indicated by the flow charts shown in FIGS. 5 to 7, the sub-memory is set and the memory transferring program is started. FIG. 8 is a view which illustrates the memory transferring program. This program acts to transfer the individual characteristics for each of the drivers stored in the sub-memory, for example, $\gamma$ characteristics shown in FIG. 4 to a main memory disposed in the controller 3. In Step 40, data is transferred from the sub-memory to the main memory. In Step 41, whether the transference has been completed or not is determined. If it is determined that the transference has not been completed, the flow returns to the first step of the flow chart, and the transference is continued. On the other hand, if it is determined that the transference has been completed in Step 41, FLAG 1 is set to "1" in Step 42 and the execution of the program is completed. FIG. 8 is a view which illustrates a program for use in a case where $\gamma$ characteristics shown in FIG. 4 are stored in the sub-memory 5. Another structure may alternatively be employed, the structure being arranged in such a manner that $\gamma$ characteristics are stored in the controller 3 and only a selector for determining the specific $\gamma$ characteristic is stored in the sub-memory 5. A memory transferring program for use in this case is shown in FIG. 9. In Step 50, the selector is transferred from the sub-memory to the main memory. Then, in Step 51, whether the transference has been completed or not is determined similarly to Step 41 shown in FIG. 8. If it is determined that the transference has been completed, the specific characteristic which corresponds to the selector are selected from the characteristics stored in the controller 3. Then, FLAG 1 set to "1" in Step 53. In a case where only the basic characteristic ($N_{or}$, characteristic shown in FIG. 4) is stored in the controller 3 and desired characteristics are obtained from calculations from the basic characteristic in accordance with the value of the selector, the processing according to Step 54 is conducted as an alternative to the processing according to Step 52. In Step 54, the desired characteristic is determined in accordance with the selector. Then, FLAG 1 is set to "1". As a result of the processings conducted in accordance with the flow charts shown in FIG. 8 or FIG. 9, data stored in the sub-memory is transferred to the main memory in the controller 3. Then, the automobile is controlled on the basis of data stored in the main memory.

Figure 10:
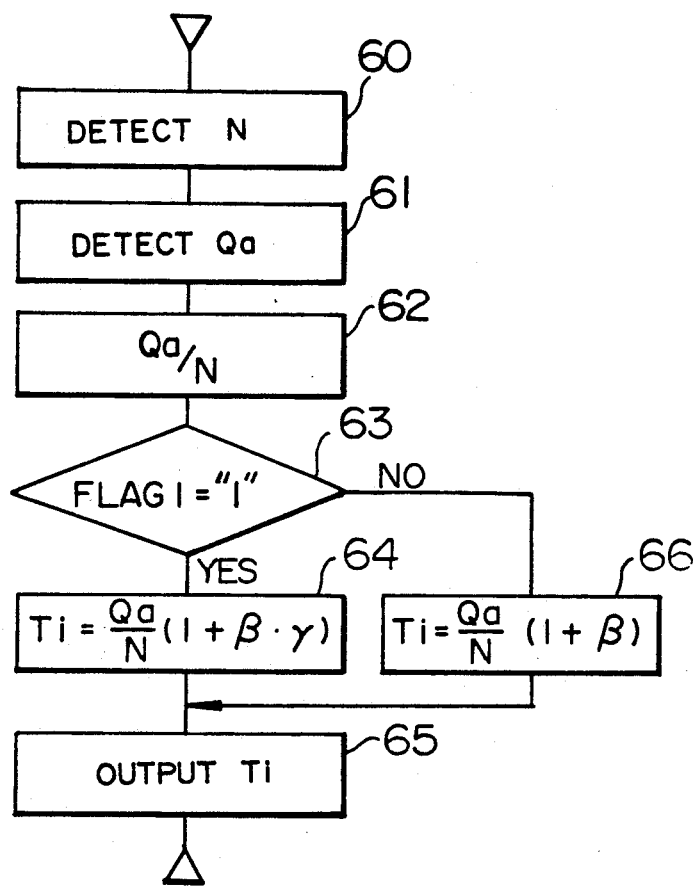

A method of the correction of the fuel quantity for use in the apparatus shown in FIG. 3 is shown in FIG. 10. A flow chart shown in FIG. 10 is executed at a predetermined timing by the timer 2. When the flow chart is started at the period determined by the timer 2, engine speed N is, in Step 60, taken in. Then, air quantity $Q_a$ is, in Step 61, taken in. As a result, basic injection time $Q_a/N$ is calculated in Step 62. Then, whether the contents in the sub-memory have been transferred is, in Step 63, determined in accordance with the state of FLAG 1. If it is determined that the transference has been completed (FLAG1 = "1"), Ti is obtained by using Equation (1) in Step 64. The thus obtained injection time Ti is a value which has been corrected in accordance with characteristics to meet the driver's desire. Then, in Step 65, Ti is transmitted. If it is determined, in Step 63, that the transference has not been completed (when FLAG1 ≠ "1") Ti is obtained by using Equation (2) as it is in which $\gamma$ is not used, and Ti is transmitted. The thus obtained injection time Ti is a usual value which has not been subjected to the characteristic correction to be performed by the driver. In a case where the individual correction characteristic ($\gamma$ characteristic in a case shown in FIG. 4) for each of the drivers have been input in the processings according to the flow chart shown in FIG. 10, control is conducted in accordance with the contents of the inputted correction characteristic. On the other hand, if it has not been input, control in accordance with the usual method is conducted. Since the automobile can be controlled in accordance with a usual method even if the sub-memory is not set, the driver of the automobile does not encounter any problem.

Figure 11:
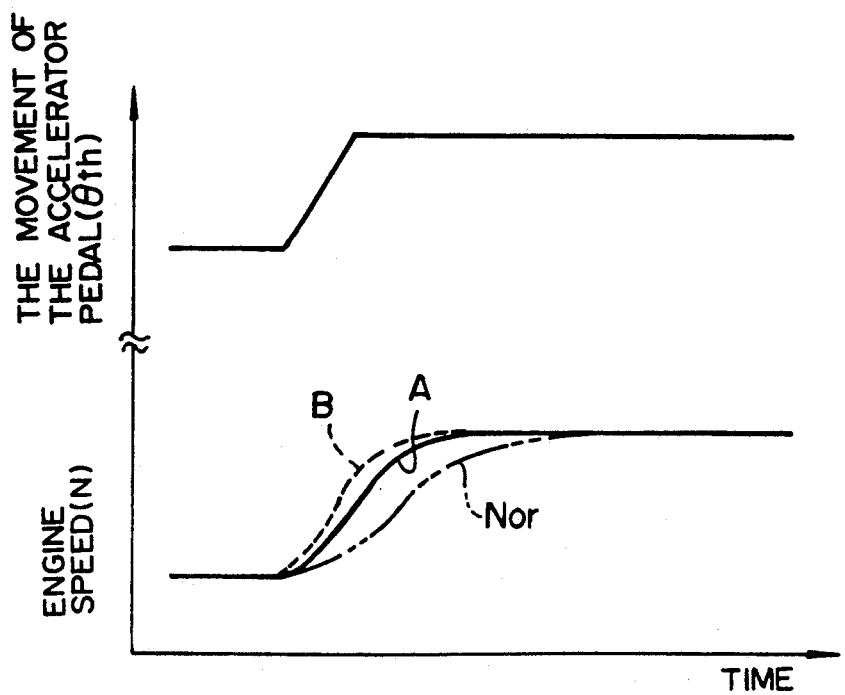
FIG. 11 is a characteristics drawing.

The operation and effect of the apparatus shown in FIG. 3 are shown in FIG. 11. FIG. 11 is a view which illustrates changes in the movement of the accelerator pedal $\theta$th and engine speed N. In a case where the $\gamma$ characteristic corresponds to the $N_{or}$ characteristics shown in FIG. 4, the first transition of engine speed becomes as shown by the graph representing $N_{or}$. When the $\gamma$ characteristic is set to a value exceeding 1.0 in a case where $d\theta$th/dt is large similar to characteristic A shown in FIG. 4, the transition of the engine speed becomes faster than $N_{or}$, similar to characteristic A. A faster first-transition can be obtained by using characteristics B than characteristic A. As described above, the driver can select an optional acceleration characteristic. In this case, movement of the accelerator pedal can be considered as the input, while the engine speed can be considered as the control variable. In a narrow sense, $Q_a$ can be considered to be the input, while Ti can be considered to be the control variable.

Then, an embodiment of a device with which the driver can determine data in the sub-memory will be described with reference to FIG. 12.

Reference numeral 70 represents a display capable of displaying graphs, the graphs showing the relationship between the movement of the accelerator pedal and acceleration (the first transition of engine speed). There are three types of the acceleration characteristics Nor, A, and B shown in FIG. 4. Assuming that the driver selects characteristic A, voltage corresponding to characteristic A is supplied by a power source 72 to the output of an adjuster 71. An A/D converter 73 is connected to the output so that voltage corresponding to characteristic A is digitized. Since a switch 75 is connected between the A/D converter 73 and the sub-memory 5, data is protected from being transferred to the sub-memory until the selection of the characteristic is completed. The driver pushes a transferring button 74 at the instant at which the acceleration characteristic has been determined. At this time, the gate of the switch 75 is opened so that data which has been A/D-converted is transferred to the sub-memory 5. As a result of the structure realized and the operation performed by the apparatus, data determined by the driver is stored in the sub-memory 5.

The control unit 3 includes ROMs 76a to 76c capable of storing data corresponding to the selected value ($N_{or}$ A, or B: to be called "selector" hereinafter), a multiplexer 77, and an arithmetic portion 78. In accordance with the value of the selector, one of the characteristics $N_{on}$, A, or B is selected, and the thus selected characteristic is connected to the arithmetic portion 78 via the multiplexer 77. For example, since characteristic A has been selected by the adjuster 71 according to the embodiment shown in FIG. 12, the ROM 76b including characteristic A is connected to the arithmetic portion 78, and Ti shown in Equation (1) is determined by using $\gamma$ stored in the ROM 76b.

Another embodiment of an apparatus for use in a case where data is determined in the sub-memory is shown in FIG. 13. The display 70 displays the acceleration characteristics in such a manner that the upper limit and the lower limit of the adjustable region are displayed. Thus, the driver is able to select optional characteristics from the above-described region by changing the characteristic in an analog manner. The acceleration characteristics can be, as designated by dotted lines, selected optionally and in an analog manner. This selection is conducted with the adjuster 80. By way of shifting the lever of the adjuster 80 to the right or left, the acceleration characteristics (designated by the dotted lines) displayed on the display can be varied. The output from the adjuster 80 is A/D-converted by the A/D converter 73. When a desired characteristic has been obtained on the display, the transference button 74 is pressed so that data is transferred to the sub-memory. As shown on the display 70, the thus transferred data becomes, for example, a value a/b (in a case where characteristic (a) is selected) which proportionally allots the upper limit and the lower limit characteristics. This value is transferred to the controller 3 which includes a ROM 81 in which the basic characteristic is stored, a characteristics arithmetic portion 82 (RAM) in which the above-described value a/b is stored, and the arithmetic portion 78. In the arithmetic portion 78, the value of $\gamma$ which is the value corrected as desired by processing the value stored in the ROM 81 on the basis of the value which corresponds to a/b is used, the processing being conducted in the characteristics arithmetic portion 82. As described above, the desired acceleration characteristic selected by using the display 80 can be obtained.

The driver switches on a key to start the engine as the usual operation. Then, the sub-memory is loaded into the apparatus before determining optional characteristics through a display so as to be transferred to the sub-memory. As a result, the characterizing of the automobile can be achieved. If the optional characteristics are first input to the sub-memory, the characterizing of the automobile can be achieved simply by loading the device into the apparatus when the driver rides in an automobile.

Figure 12:
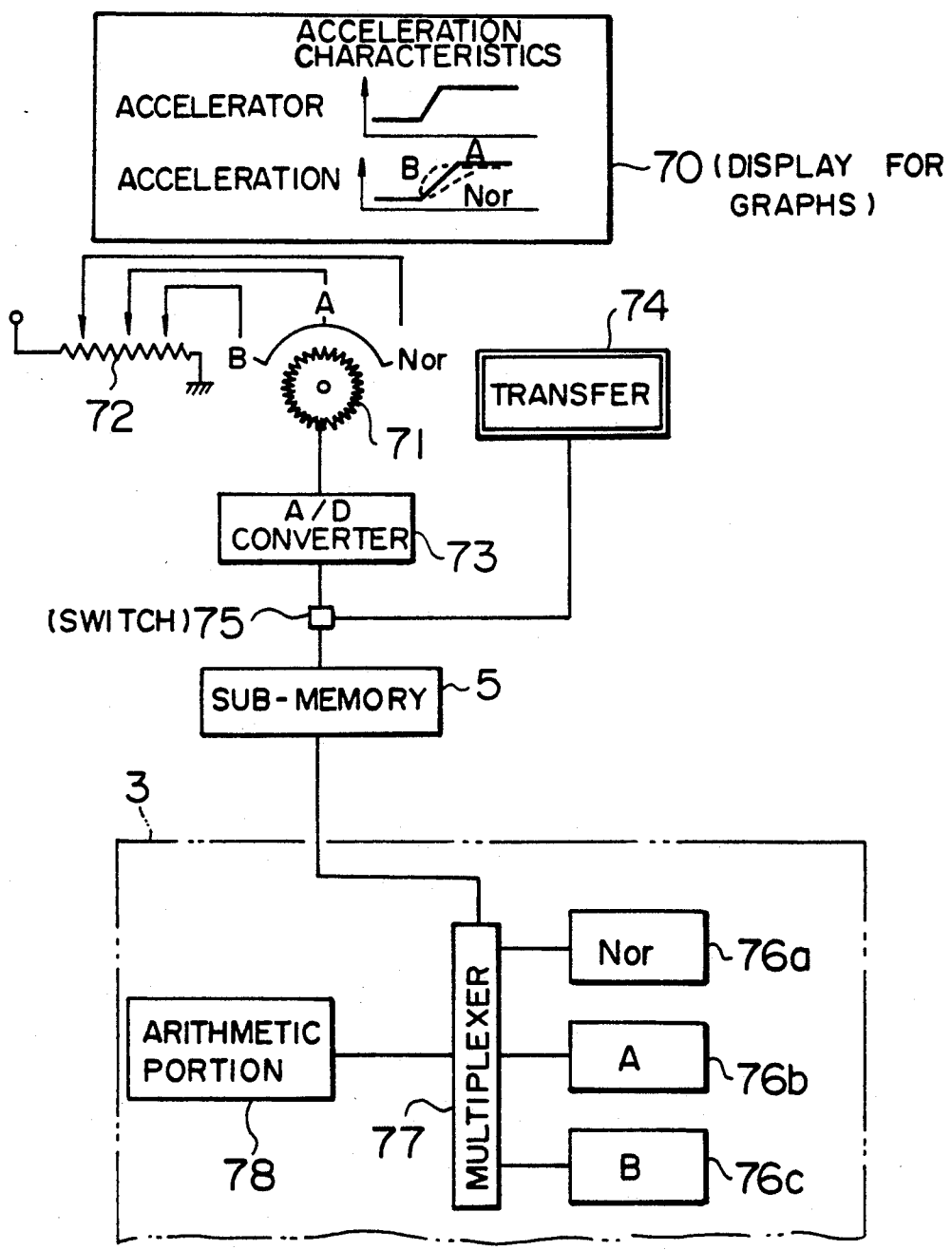

According to the embodiment shown in FIG. 12, a structure arranged such that storage means capable of storing selectors is provided for the multiplexer 77 does not encounter a problem in the driving of the automobile even if the sub-memory 5 is drawn out during the driving of the automobile. Also, according to the embodiment shown in FIG. 13, a structure arranged such that storage means capable of storing a/b is provided for the characteristics arithmetic portion 82 does not encounter a problem in the driving of the automobile even if the sub-memory 5 is drawn out during the driving of the automobile.

Then, a method will be described, the method being necessary when the determined acceleration characteristics are intended to be changed after starting the driving of the automobile in accordance with the contents of the sub-memory 5. According to the embodiment shown in FIG. 13, when only the acceleration characteristic is, for example, intended to be changed during the driving of the automobile, the sub-memory 5 it is necessary to remove and the adjuster 80 is to be used so as to select characteristics before pushing the transference button 74. As a result, the driving of the automobile in accordance with the current characteristics can be conducted. If the driving is intended to be conducted again in accordance with the characteristic stored in the sub-memory 5, the sub-memory 5 is to be loaded into the apparatus again. The operations for use in these cases are show in FIGS. 14 and 15.

Figure 14:
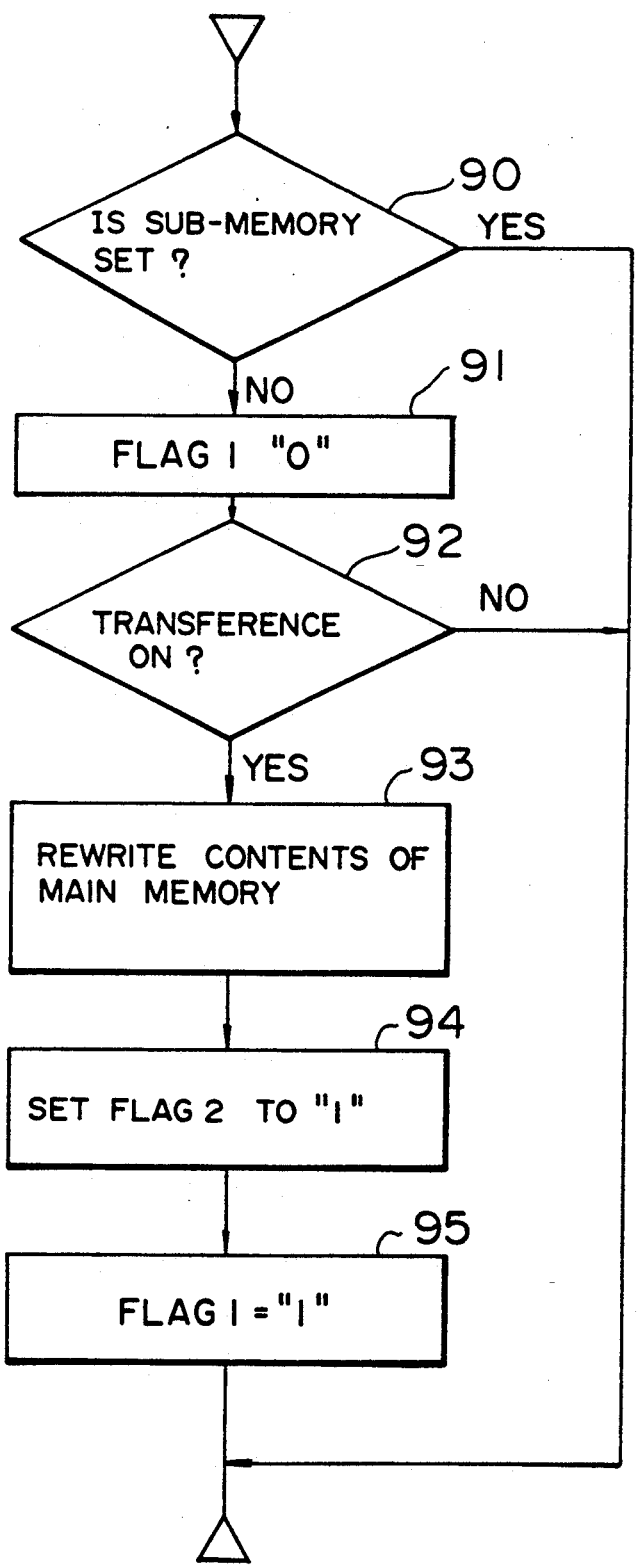

Referring to FIG. 14, whether the sub-memory 5 has been set or not is determined in Step 90. If it is determined that it has been set, the processing ends as it is. On the contrary, if it is determined that it has not been set, it means that the sub-memory 5 has been removed. Therefore, FLAG1 is immediately set to "0" in Step 91 so as to again realize the standard acceleration mode.

Then, whether the transference button 74 has been pressed or not is determined in Step 92. If it is determined that the transference button 74 is not pressed, the processing ends as it is. On the contrary, if it is determined that the transference button 74 is pressed, the contents set by using the adjuster 80 and the contents in the main memory (RAM 82) are rewritten in Step 93. In the next Step 94, FLAG2 is set to "1". The time period during this means that the sub-memory has been removed during the driving of the automobile. FLAG1 is also returned to "1 ∞ in Step 95. As a result of this flow, characteristics other than the contents in the sub-memory can be set and driving according to the characteristics can be enabled.

When the driving of the automobile is intended to be conducted again in accordance with the contents in the sub-memory 5, it is necessary for the sub-memory 5 to be loaded onto the apparatus again. A flow in this state is shown in FIG. 15. First, whether FLAG2 is "1" or not, that is, whether or not the sub-memory is drawn out and the driving of the automobile in accordance with the other content is conducted is determined in Step 100. If it is determined that FLAG2 is not "1", the processing ends as it is. On the contrary, if it is determined that FLAG2 is "1", whether the sub-memory has been set or not is determined in Step 101. If it is determined that the sub-memory 5 has not been set, the processing ends as it is. If it is determined that the sub-memory 5 has been set, the memory transference program is started in Step 102 so as to transfer the contents of the sub-memory 5 to the main memory. In Step 103, FLAG2 is then set to "0". As a result, the driving in accordance with the contents of the sub-memory 5 can be again conducted simply by loading the sub-memory 5 onto the apparatus. The processing according to the flow shown in FIG. 14 is started by the timer 3, while the processing according to the flow chart shown in FIG. 15 is started by the timer 4.

As a result, the flow of the processings conducted in a case where the driver intends to change the characteristics during the driving of the automobile in accordance with the contents of the sub-memory 5 can be realized.

Although the description of the present invention has been made with reference to acceleration characteristics, a correction of the gear shift pattern selected from a variety of applicable examples as shown in FIG. 2 will be described.

Figure 16A:
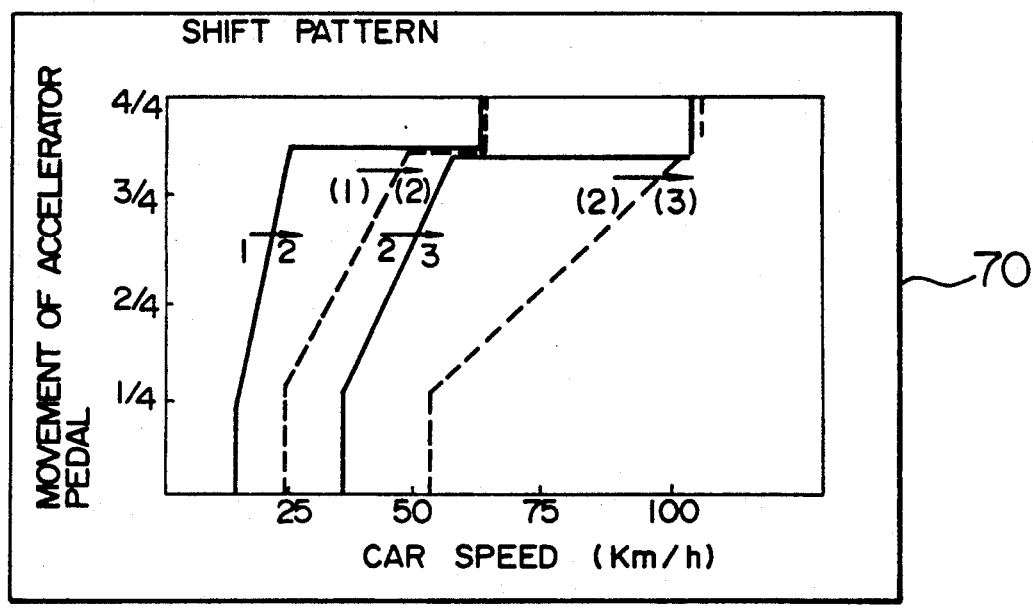
FIGS. 16a, 16b, and 17 are views which illustrate the other embodiment of the present invention.
Figure 16B:
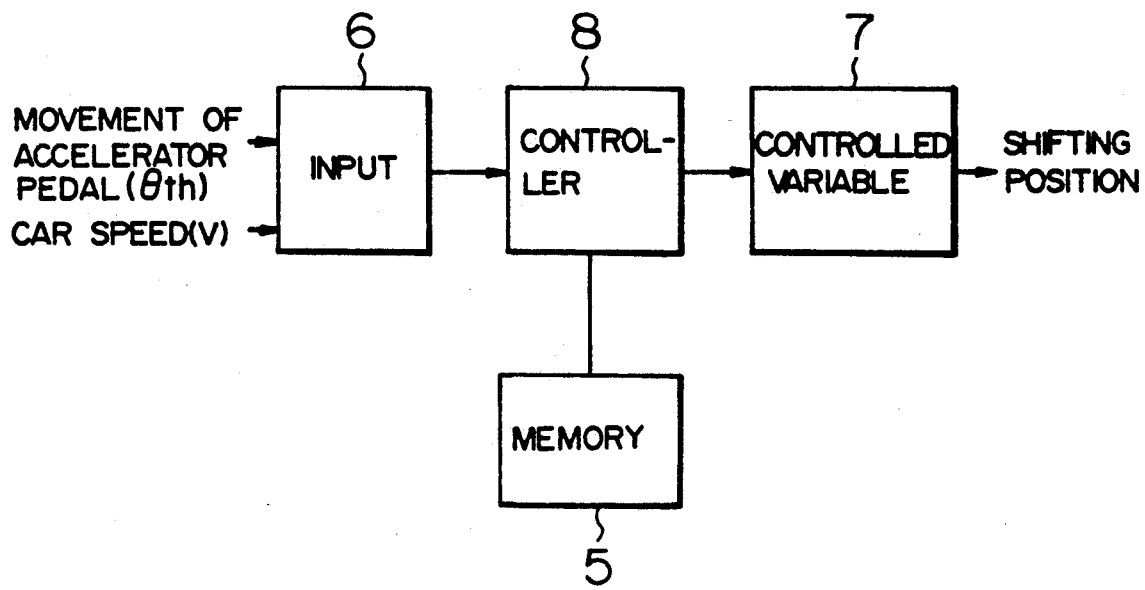

FIG. 16 is a view which illustrates the characteristics of the correction of the gear shift pattern. This structure is arranged for the purpose of changing the gear shift pattern as shown in FIG. 16(a) in an automatic transmission equipped with a torque converter. The shift pattern is arranged such that the gear shifting position (shift point) is determined by the relationship between the movement of the accelerator pedal (it may be a signal representing a load, such as the degree of opening of the throttle valve) and the speed of the automobile. Referring to FIG. 16(a), $1 \to 2$ represents the gear shift from low speed to second speed, while $2 \to 3$ represents the gear shift from second speed to third speed. Also referring to the drawing, a continuous line and a dotted line represent two shift patterns each of which has individual characteristics. According to this embodiment, the shift pattern is changed in such a manner that the movement of $\theta$th of the accelerator pedal and the automobile speed V are arranged to be the inputs, while the line pressure in the automatic transmission, in other words, the shifting position, is arranged to be the control variable. According to this embodiment, the relationship between the factors above is changed in accordance with the contents stored in the sub-memory 5.

Figure 17:
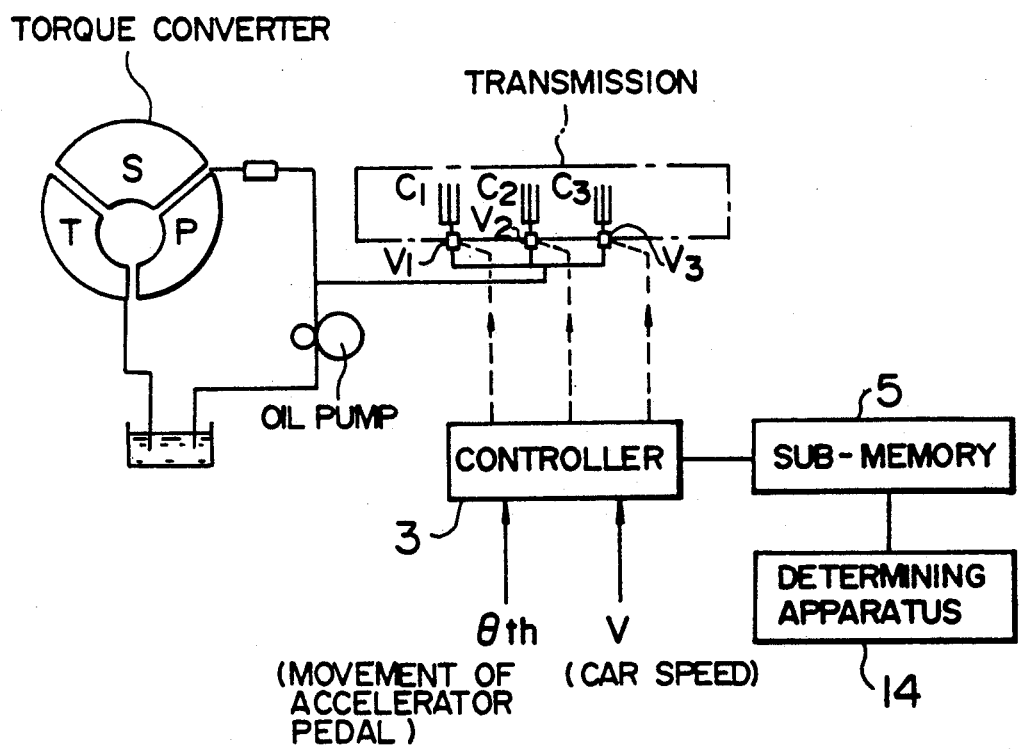

The structure of the transmission and the same of the controller 3 are shown in FIG. 17. Oil pressure caused by an oil pump is selectively exerted on clutches $C_1$, $C_2$, and $C_3$ by the valves $V_1$, $V_2$, and $V_3$ operated in response to the signal from the controller 3 so that a desired clutch is engaged or released. By selecting a desired clutch from clutches $C_1$, $C_2$, and $C_3$, desired speed can be selected from low, second, and third speed. The controller 3 is arranged to be supplied with $\theta$th and V, and the characteristic of the shifting positions is inputted from the sub-memory 5.

Figure 18:
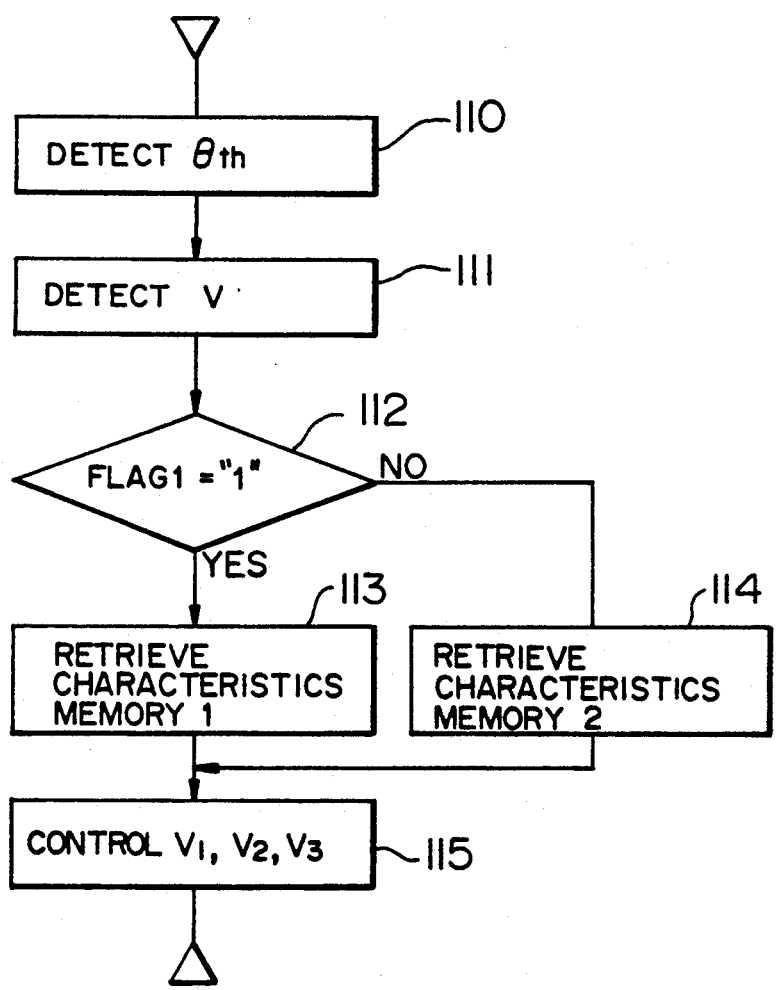
FIG. 18 is a flow chart.
Figure 19:
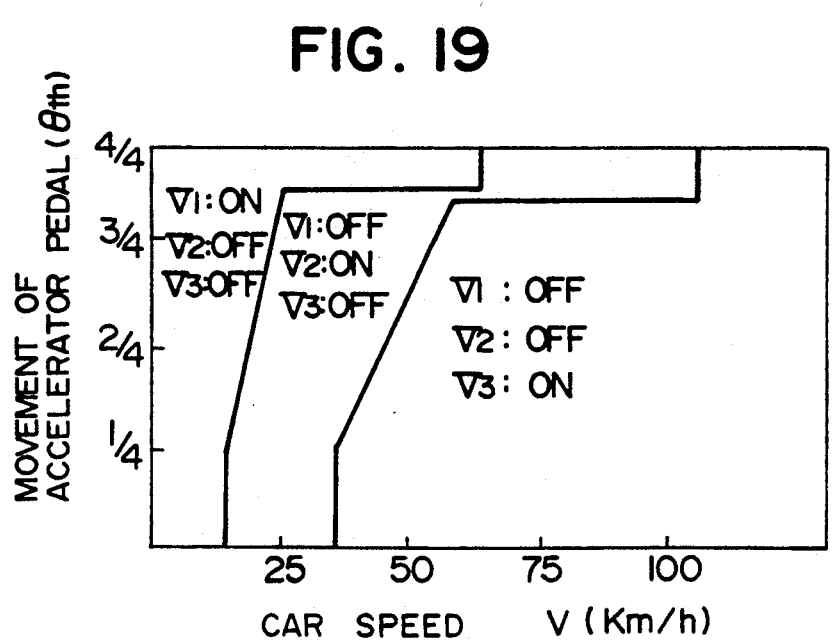
FIG. 19 is a characteristics drawing.

The structure is arranged such that the desired shift pattern is determined by using a switch knob or a volume button 14 as shown in FIGS. 12 and 13. The contents of the determination is stored in the sub-memory 5 by then pressing the transference button. The flow chart corresponding to the ensuing processings is the same as those shown in FIGS. 5 to 9 and FIGS. 14 and 15. The flow chart which corresponds to the flow chart shown in FIG. 10 is shown in FIG. 18. The processings to be conducted in accordance with this flow chart are started by the timer 5. In Steps 110 and 111, the movement $\theta$th of the acceleration pedal and the automobile speed V are detected. In the next Step 112, FLAG 1 which represents whether the contents of the sub-memory 5 have been transferred or not is confirmed. If the FLAG1 is determined to be "1", the valves $V_1$, $V_2$, and $V_3$ are controlled by the characteristics memory 1 (the individual characteristic for each of the drivers transferred from the sub-memory 5) in Step 113. The characteristics memory 1 may be a memory capable of indicating whether the valves $V_1$, $V_2$, and $V_3$ are opened or closed by using $\theta$th and V as shown in FIG. 19. When it is determined that FLAG1$\neq$"1" in Step 112 shown in FIG. 18, the valve $V_1$, $V_2$, and $V_3$ are controlled by the characteristics memory 2 as shown in Step 114, the characteristics memory 2 storing a shift pattern corresponding to the standard mode. As a result of the apparatus and the operation, a shift pattern desired by the driver can be selected.

Figure 20:
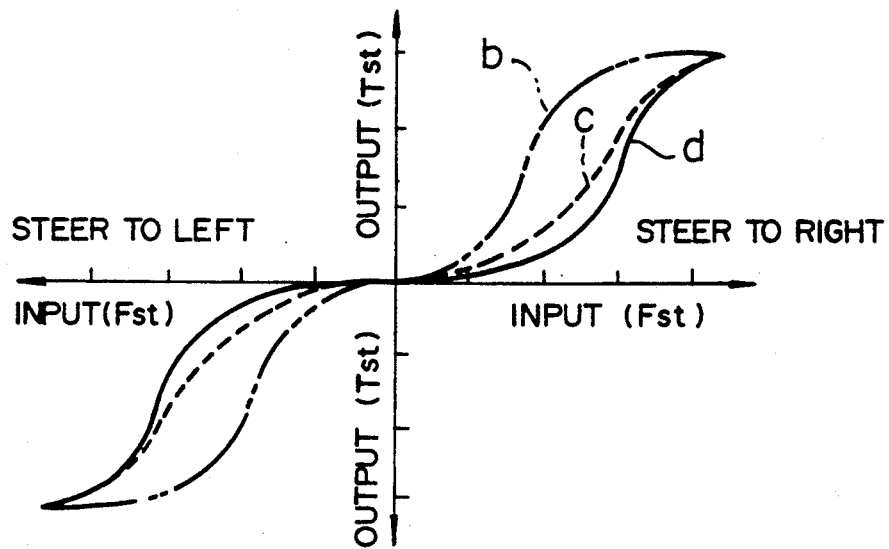
FIG. 20 also is a characteristics drawing.
Figure 21:
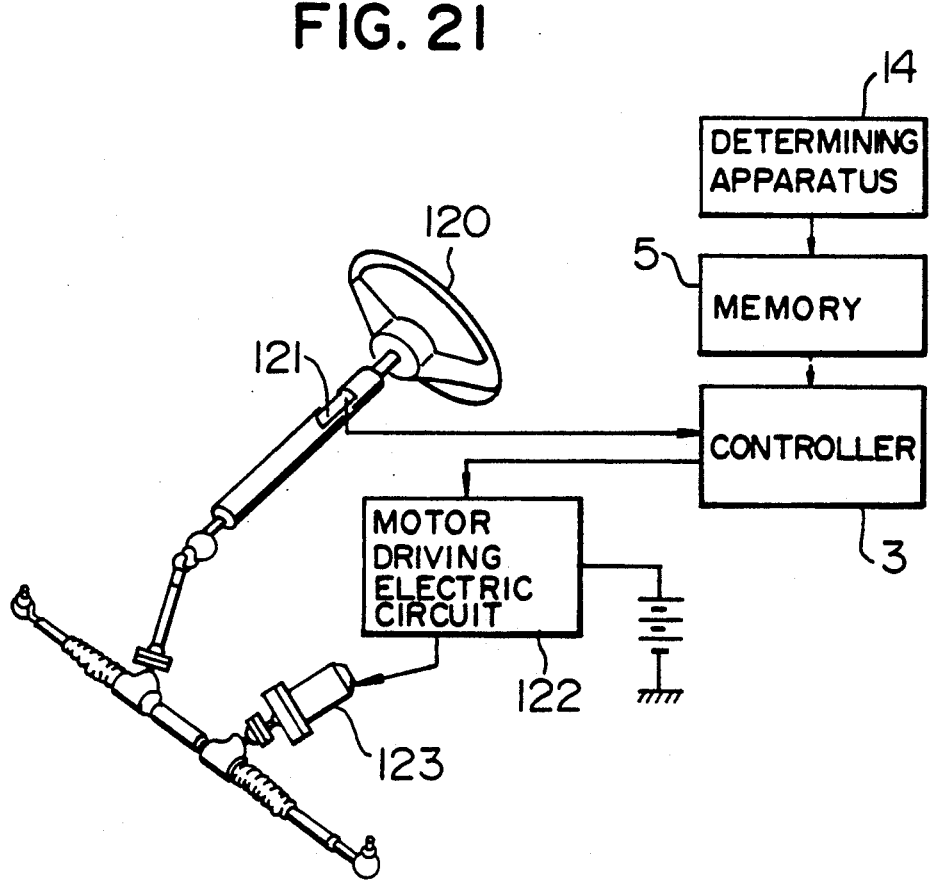
FIGS. 21 and 22 are views which illustrate the other embodiment of the present invention.

Referring to FIG. 20, another embodiment will be described in which the steering characteristics of the steering wheel are changed. FIG. 20 is a view which illustrates the characteristics where the input thereof is the operating force for the steering wheel and the output thereof is the steering force for the tire. The structure is so arranged that desired characteristics can be selected from (b), (c), and (d) by the driver. FIG. 21 is a view which illustrates the structure of this apparatus. When a steering wheel 120 is turned by the driver, the operating force is detected by an input sensor 121, the operating force being then input to the controller 3 in terms of the quantity of the force. On the basis of this signal and the characteristics shown in FIG. 20, a force is transmitted to the tire by the motor 123 via a motor rotating circuit 122. The characteristic in the controller 3 is arranged to be supplied from the sub-memory 5. The structure and the control flow chart for the determining apparatus 14 are the same as those in the case of the acceleration characteristics. The graph shown in FIG. 20 is displayed on the display 70 so as to enable selection of an optional characteristics by way of the adjuster. According to this embodiment, the force for operating the steering wheel is arranged to be the input, while the steering force for the tire is arranged to be the control variable whereby the relationship between the above two factors are corrected by the individual contents stored in memory for each of the drivers.

Figure 22:
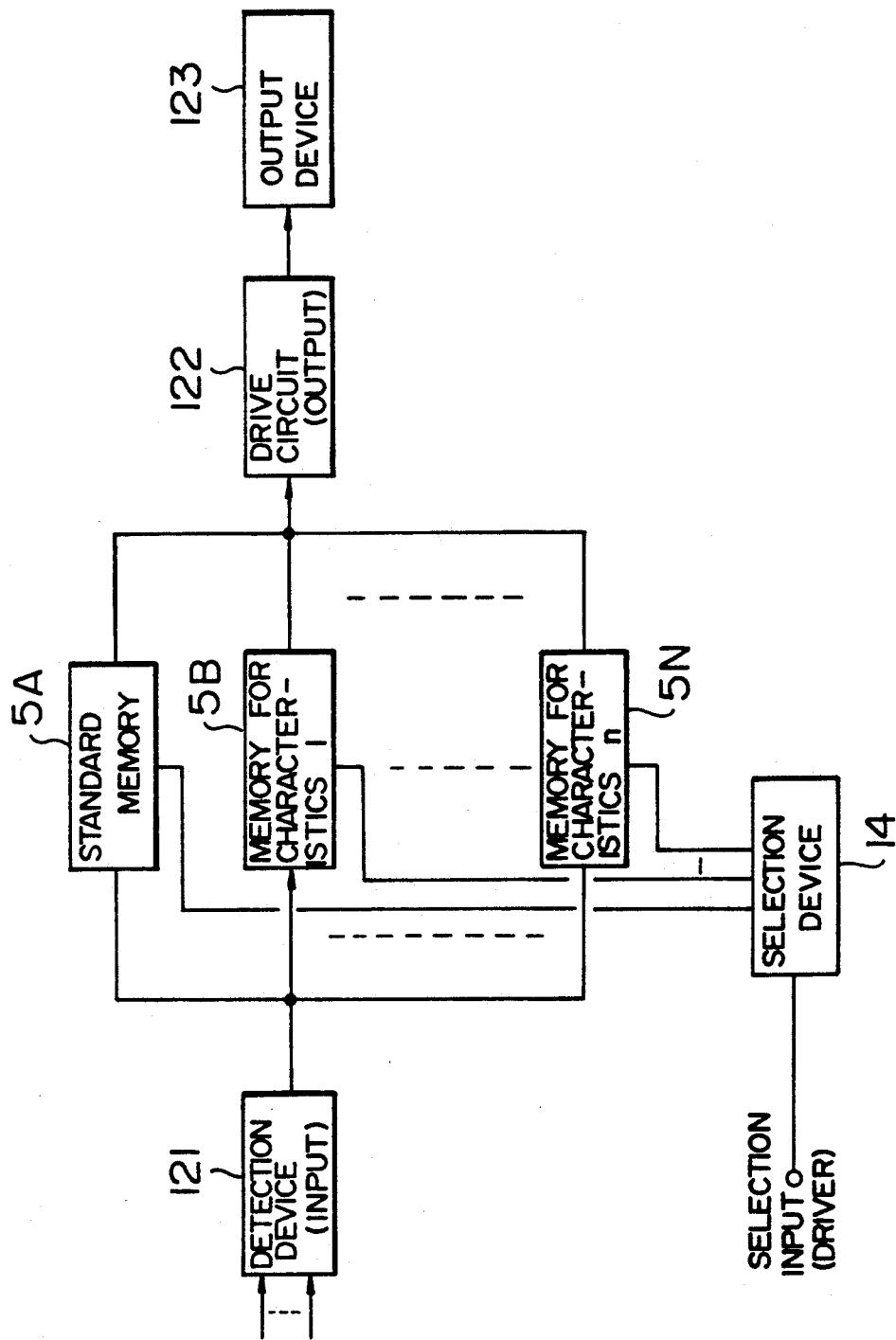

FIG. 22 is a block diagram for use in the device for determining the steering characteristics shown in FIG. 21.

A detection device 121 acts to detect a rotational moment (Fst) of the steering wheel 120. On the basis of the thus detected Fst, a steering force Tst, of the wheel is determined by using one of the various characteristics shown in FIG. 20. The driver is thus able to select a desired characteristics from the characteristic (b), (c), and (d) shown in FIG. 20. The characteristics shown in FIG. 20 correspond to a memory 5A for a standard characteristic, a memory 5B for characteristic 1, ..., a memory 5N for characteristics n. The driver is able to select an optional characteristic from the above-described characteristics by inputting it to the determining apparatus 14. If any selection is not made, the driving is performed in accordance with the contents of the standard memory in which the standard characteristic are stored. After the memory has been specified, the relationship between the input and the output is determined in accordance with the characteristic stored in the specified memory. A signal is transmitted to the motor rotating circuit 122 so that the torque for the motor is determined, whereby an output device 123 is operated via the motor rotating circuit 122.

Figure 23:
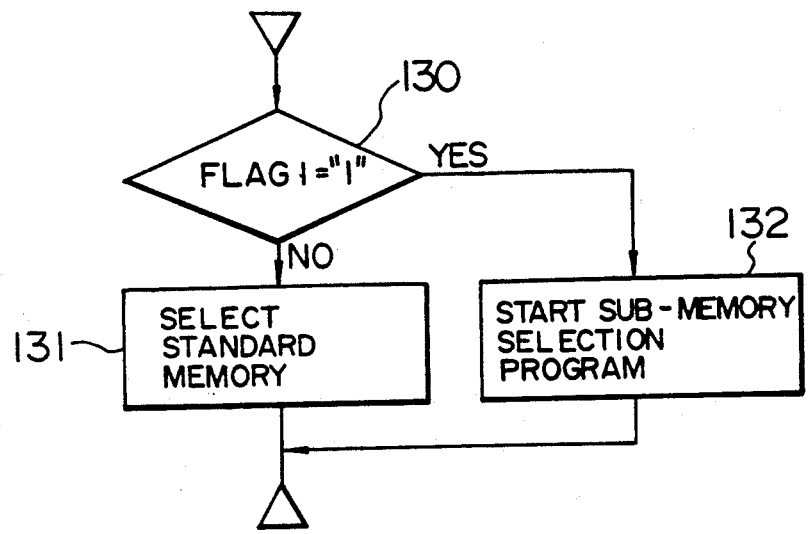
FIGS. 23 to 25 are flow charts.
Figure 24:
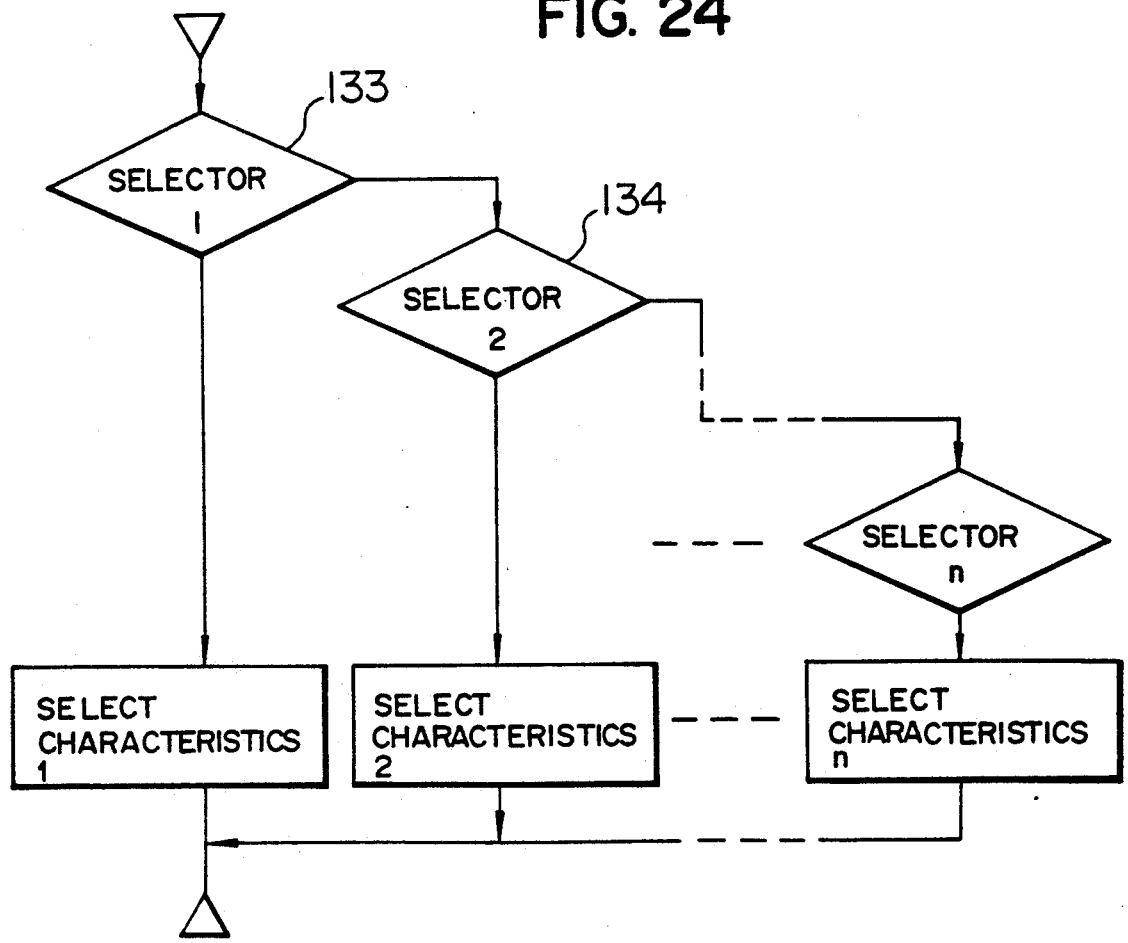

FIGS. 23 and 24 are views which illustrate flow charts for a control unit for operating the device shown in FIG. 21. After executing the processings in accordance with the flow shown in FIGS. 5 to 9, FLAG1 is determined in Step 130 as shown in FIG. 23 so that a program capable of selecting either the standard memory or the sub-memory is carried out. If the standard memory is selected in Step 131, the process returns to the flow chart shown in FIG. 25. In the flow shown in FIG. 25, the detected value of Fst is read in Step 141, and Tst, is determined in accordance with, for example, the characteristics shown in FIG. 20 in Step 142. In this case, the value of Tst is determined on the basis of the standard characteristic stored in the standard memory. Then, the thus determined value of Tst is transmitted to the motor rotating circuit 122 in Step 143.

Figure 25:
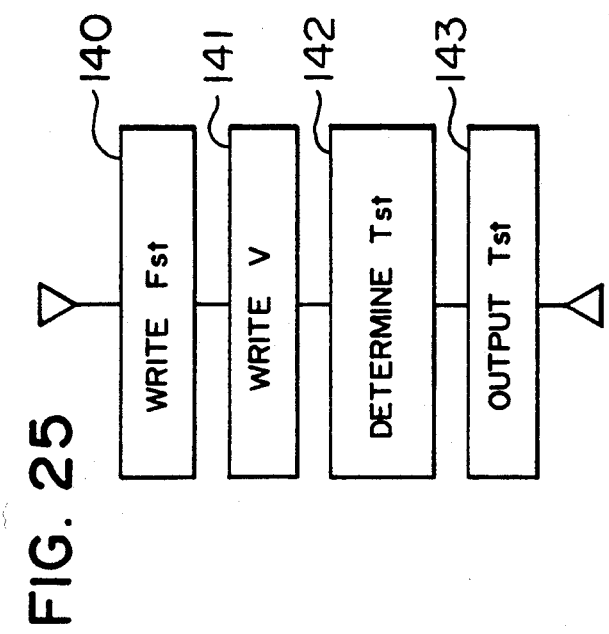

If the sub-memory is selected in Step 132 referring to FIG. 23, a program for selecting the sub-memory shown in FIG. 24 is started. In this case, a certain characteristic (any of 1, 2, ..., n) is selected in Steps 133 and 134, and the flow shown in FIG. 25 is executed, where a previously-selected characteristic is used to determine Tst and the ensuing operation is conducted as described above.

As described above, the relationship between the force for turning the steering wheel and the force for steering the automobile wheel can be optionally selected by the driver. For example, a young women can select a characteristic with which a great steering force Tst can be obtained necessitating a small force for turning the steering wheel. The similar characteristic can also be selected when the automobile is intended to be driven through a region in which a large number of narrow corners is present, such as when the automobile is intended to be garaged or parked. Furthermore, a characteristic in which the gain between the force for turning the steering wheel and the tire steering force is small can be selected by a young man or in a case of high speed driving of the automobile.

Figure 26:
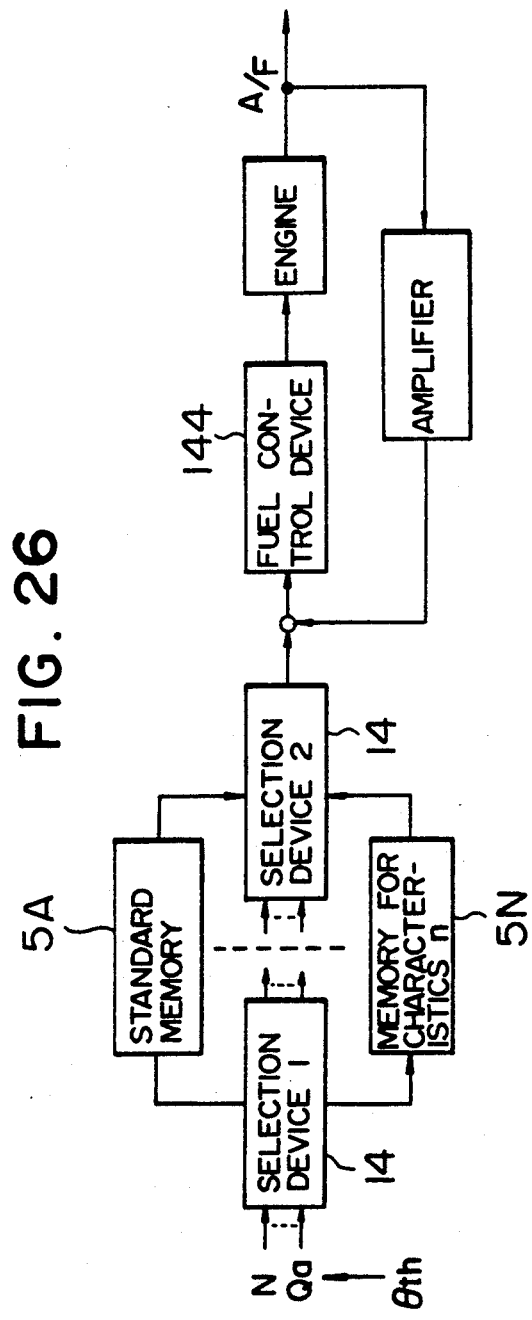
FIG. 26 is a view which illustrates the other embodiment of the present invention.
Figure 27:
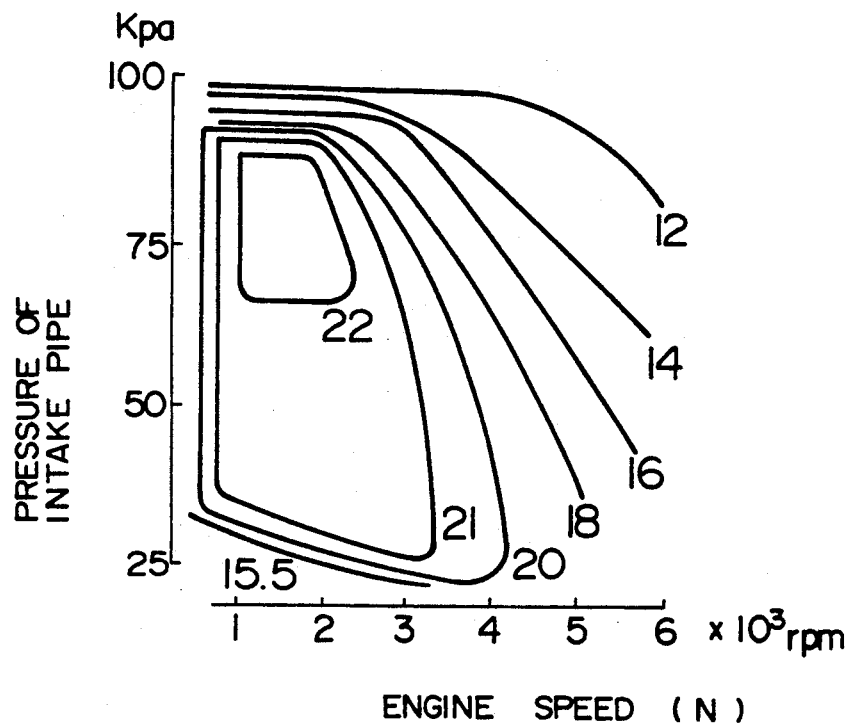
FIGS. 27 to 29 are characteristics drawings.
Figure 28:
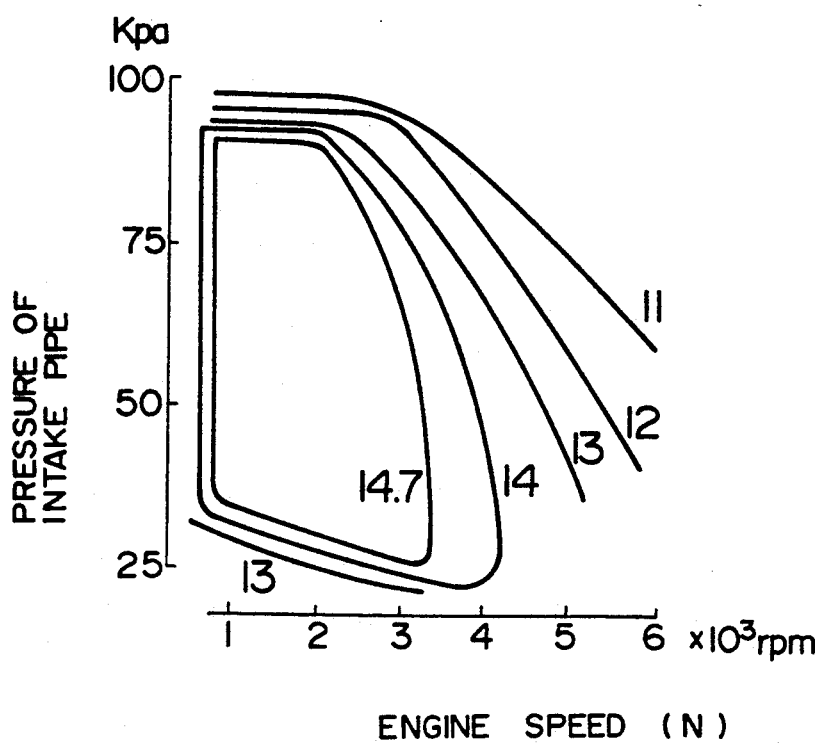

FIG. 26 is a view which illustrates a block diagram for use in a characteristics determining apparatus with which the characteristics of air/fuel ratio of an engine can be optionally selected. By means of the selection device 14, any of the standard memory or memories 5A to 5N for the characteristics 1 to n can be selected. These memories store, for example, a desired value of air/fuel ratio shown in FIG. 28. According to the embodiments shown in FIGS. 27 and 28, a desired air/fuel ratio can be obtained from the engine speed N and the pressure of the intake pipe, that is, a quantity $Q_a$ of air. FIG. 27 is a view which illustrates the lean/burn characteristics, while FIG. 28 is a view which illustrates characteristics in which a control to realize air/fuel ratio=14.7 is conducted. In addition, characteristics in which a large output is intended to be obtained and the like can be prepared. Thus, the driver can select an optional one from the above-described characteristics by conducting an input operation to the selection device.

When the characteristics memory is selected referring to FIG. 26, the desired value is inputted to a fuel control device whereby fuel of a quantity which has been thus controlled is supplied to the engine. The air/fuel ratio of the exhaust gas from the engine is detected, the air/fuel ratio then being fed back so as to be subjected to a comparison made with the desired value.

Figure 29:
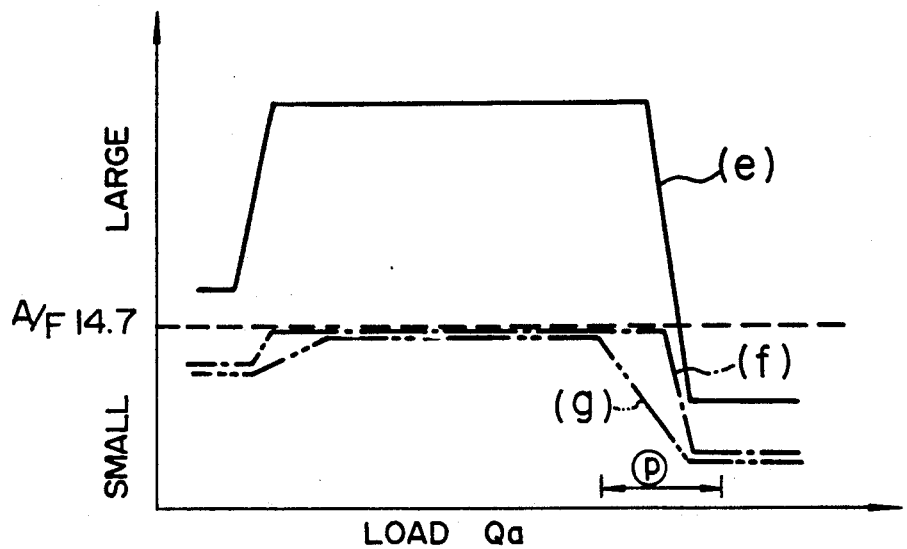

FIG. 29 is a view which illustrates the relationship between $Q_a$ at a certain engine speed and the desired air/fuel ratio. The driver is able to select a desired one from the shown characteristics (e), (f), and (g). Both the characteristics (f) and (g) are characteristics based on an air/fuel ratio=14.7, where the characteristic (g) contains portion (p) in which the air/fuel ratio is small although $Q_a$ is reduced so that the characteristic (g) is arranged to be the characteristic in which a greater output is intended to be obtained.

Figure 30:
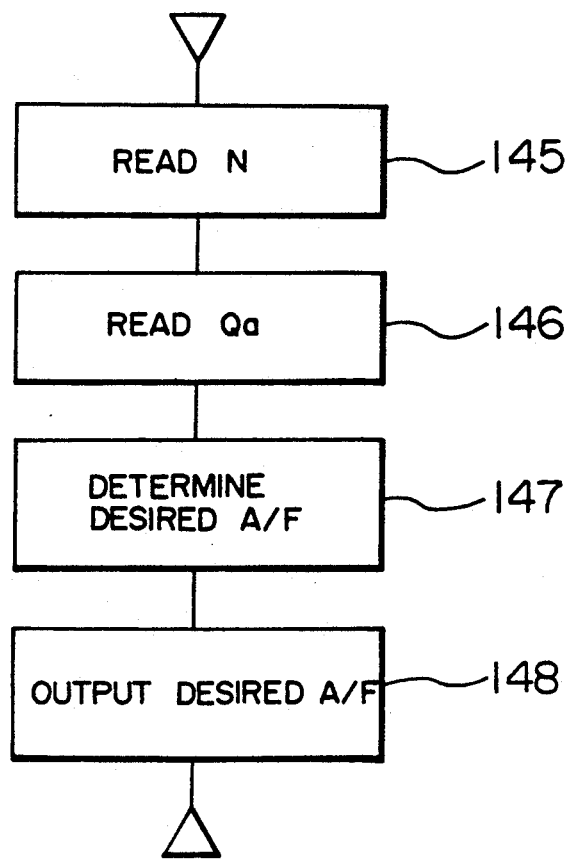
FIG. 30 is a flow chart.

FIG. 30 is a flow chart. After the completion of the processings according to the flow charts shown in FIGS. 23 and 24, the flow chart shown in FIG. 30 is tasked by a timer After N and $Q_a$ have been read in Steps 145 and 146, a desired controlled-value of the air/fuel ratio is determined in Step 147 on the basis of the memory for the selected characteristic, the desired controlled-value being then transmitted to the fuel control device in Step 148.

When the driver intends to drive the automobile economically, the lean burn characteristics as shown in FIG. 27 are selected, while the same intends to drive the automobile with a great output, the characteristics as shown in FIG. 28 are selected.

Figure 31:
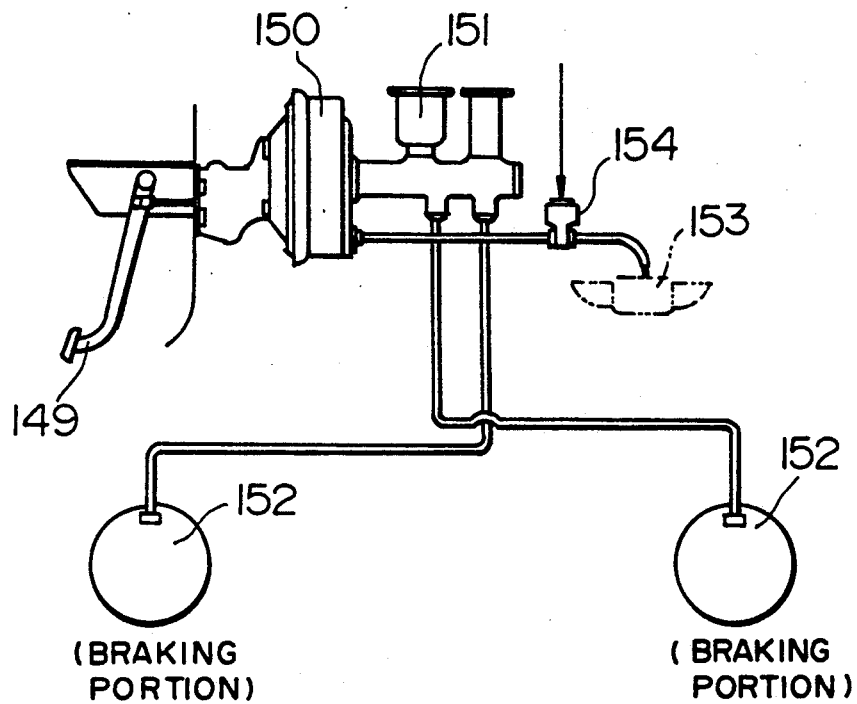
FIGS. 31 and 32 are views which illustrate the other embodiment of the present invention.

FIG. 31 is a view which illustrates an embodiment of the characteristics determining apparatus with which the brake operating characteristics can be optionally selected. When the driver applies a force to a brake pedal 149, the thus applied force is transmitted to an oil pressure device 151 via a booster 150. The thus transmitted force is exerted on a braking portion 152 so that the wheel is braked. The negative pressure in an intake pipe 153 is, as a sub-assisting force, exerted on the booster 150, the negative pressure being controlled by a negative pressure control valve 154 so that the gain of the booster 150 is varied. Alternatively, the gain of the force can be varied by changing the diameter of an orifice of a relief valve of the oil pressure device 151.

Figure 32:
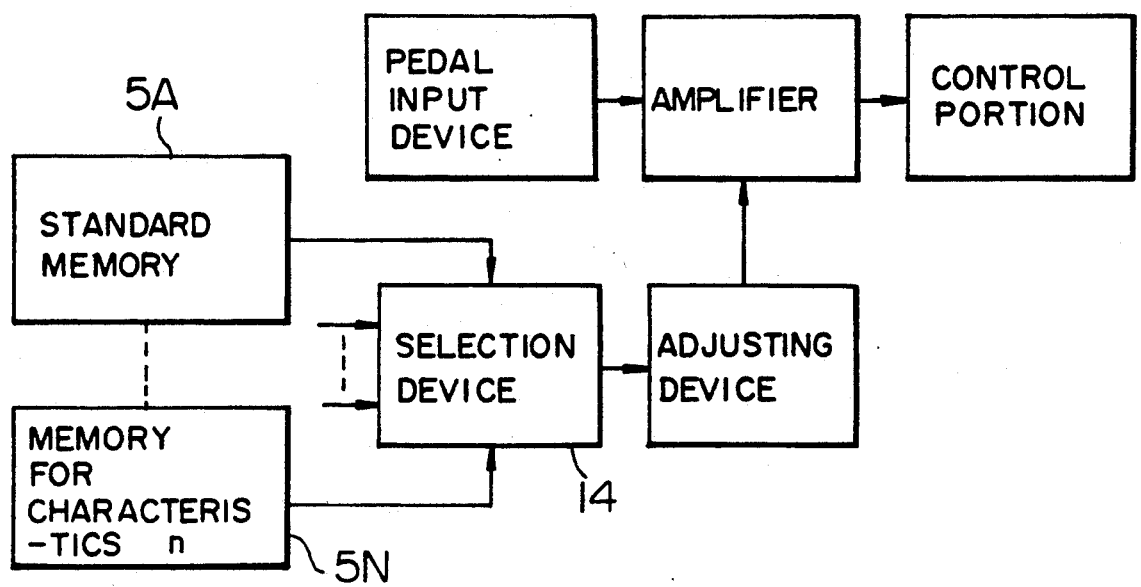
Figure 33:
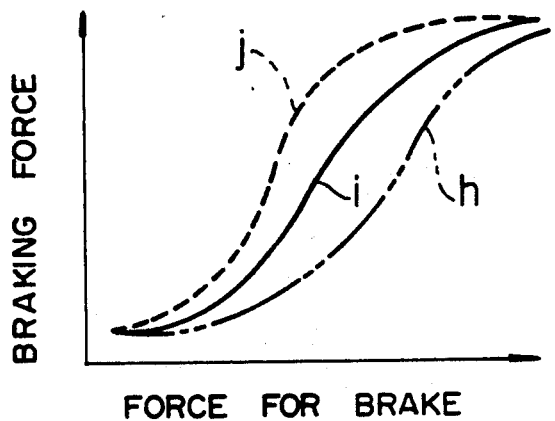
FIGS. 33 and 34 are characteristics drawings.

FIG. 32 is a block diagram for the brake device. The driver is capable of selecting any of the memories 5A to 5N by means of the selection device 14. The negative pressure or the oil pressure is adjusted as described above on the basis of the value stored in the selected memory, the gain of the force exerted on the force applied to the pedal and the control unit is varied. The characteristics between the force applied and the braking force is shown in FIG. 33. Referring to FIG. 33, characteristic (h) is a smooth braking characteristic, characteristic (j) is a quick braking characteristic, and characteristic (i) is an intermediate or standard characteristic. The driver is able to selected the optional characteristics taking the desire or the driving condition into consideration. If the selection of the characteristics is not executed, the operation according to the standard characteristic as designated by curve (i) is conducted.

Figure 34:
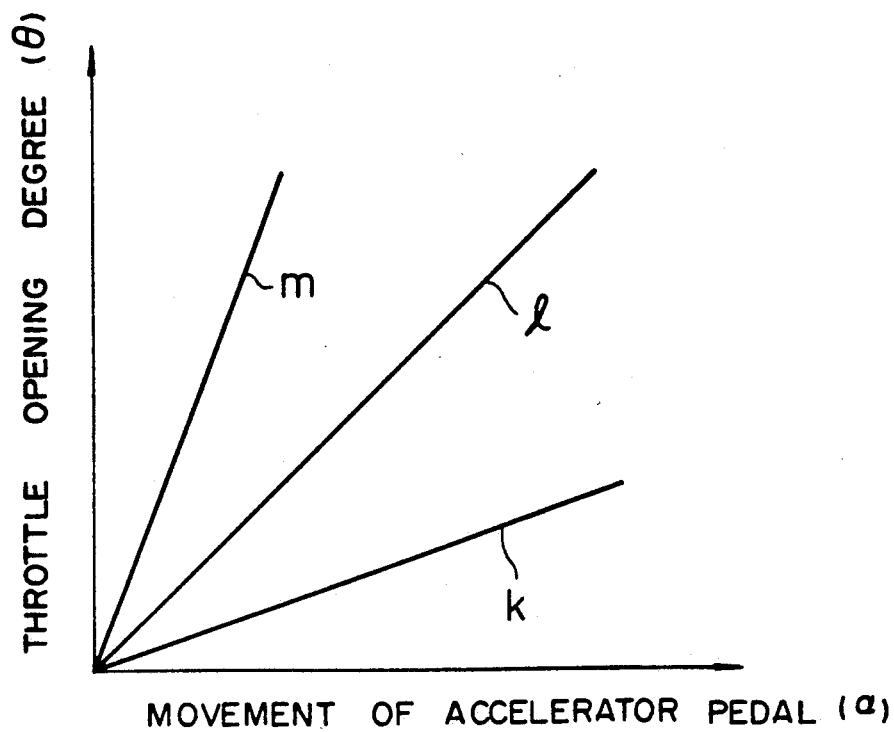

FIG. 34 is a view which illustrates the individual memory of the characteristic determining apparatus for controlling the throttle valve. Referring to the drawing, the abscissa shows values of the movement ($\alpha$) of the accelerator pedal, while the coordinate indicates values of the degree ($\theta$) of opening of the throttle. As shown in this drawing, the individual memory stores $\theta$ with respect to $\alpha$ such as (k), (l), and (m). The characteristic (k) selected by the driver represents a slow acceleration, the characteristic (l) represents usual acceleration, and the characteristic (m) represents a quick acceleration, that is, a sporting acceleration.

Figure 35:
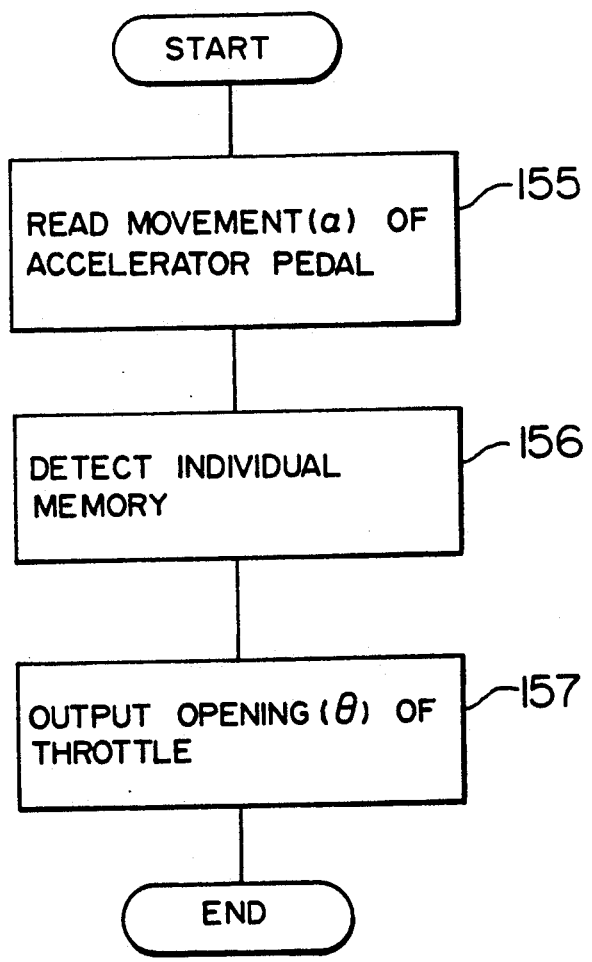
FIG. 35 is a flow chart.
Figure 36:
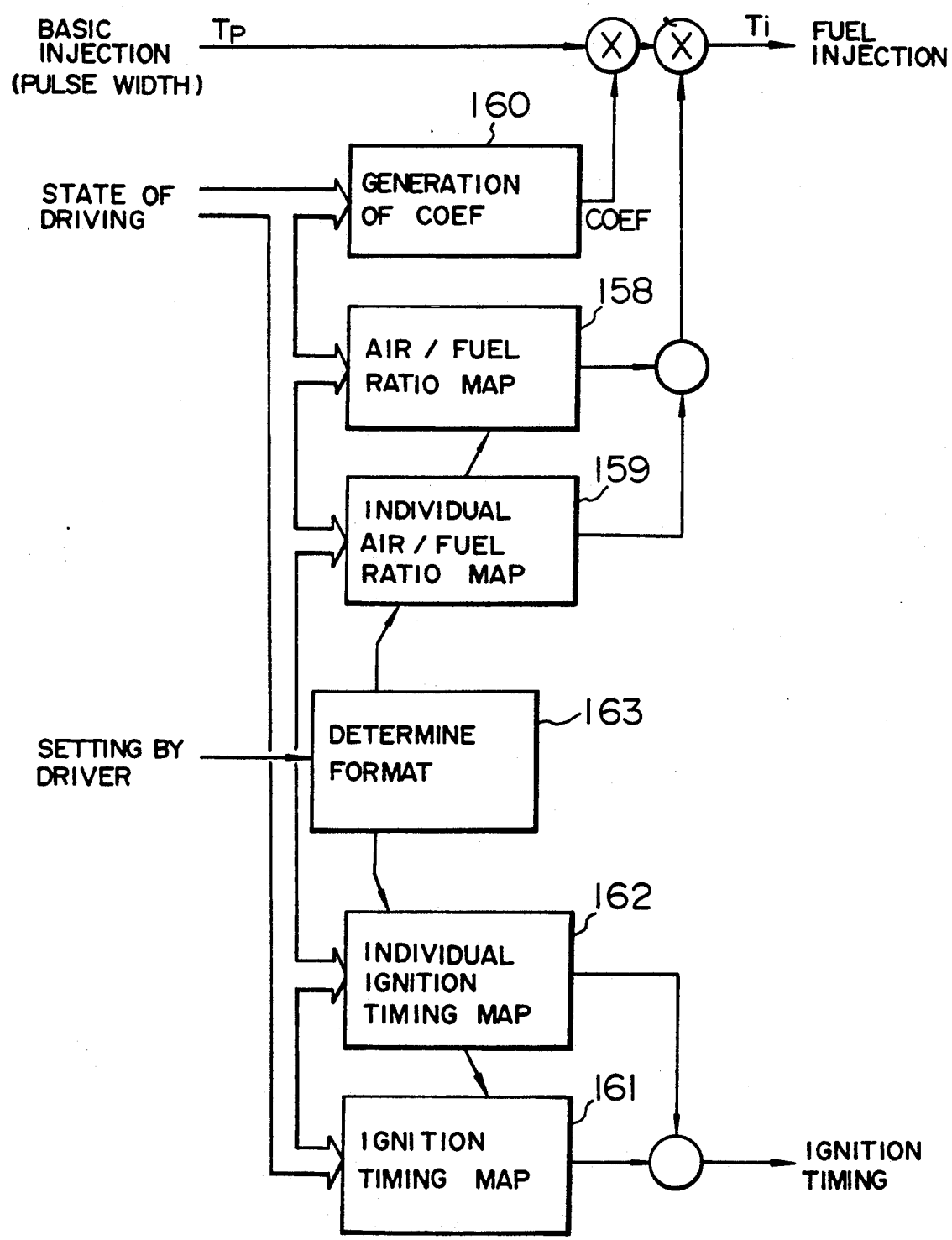
FIG. 36 is a view which illustrates the other embodiment.

FIG. 35 is a flow chart for use in the controlling of the throttle valve. In Step 155, the intention of the driver, that is, the movement ($\alpha$) of the accelerator pedal is read. In Step 156, the output of the engine required by the driver, that is the degree of opening of the throttle valve is detected from the individual memory. In Step 157, the degree ($\theta$) of opening of the throttle valve is transmitted so as to operate the throttle valve. As a result, the driving meeting according to the driver's individual desire can be conducted.

Referring to FIGS. 36 to 42, the determination of the individual driving characteristics for each of the drivers will be specifically described. According to this embodiment, an individual air/fuel ratio map 159 is provided, the individual air/fuel ratio map 195 is capable of additively correcting the air/fuel ratio map 158 which is able to convert the characteristics thereof in terms of the fuel injection. The above described two maps are retrieved in accordance with the driving conditions, where the driving conditions for retrieving the two maps are the engine speed N and the basic injection pulse width Tp. As a result, the map is arranged in a two-dimensional form which is usually arranged to have a 16×16 configuration. A coefficient generation 160 is the sum of various correction coefficient such as correction of the temperature of water and post-idling increase.

This embodiment is characterized in that an individual ignition timing map 162 is provided therein, the individual ignition timing map 162 being capable of correcting an ignition timing map 161. The ignition timing map is, similarly to the air/fuel ratio map 159, structured by 16×16 configuration which can be retrieved biaxially according to the engine speed N and the basic fuel injection pulse width Tp.

The elements of the individual air/fuel ratio map 159 and the individual ignition timing map 162 are converted by the formatting 163. The formatting is determined by the driver by using an input device disposed on the control panel in the compartment of the automobile.

Figure 37:
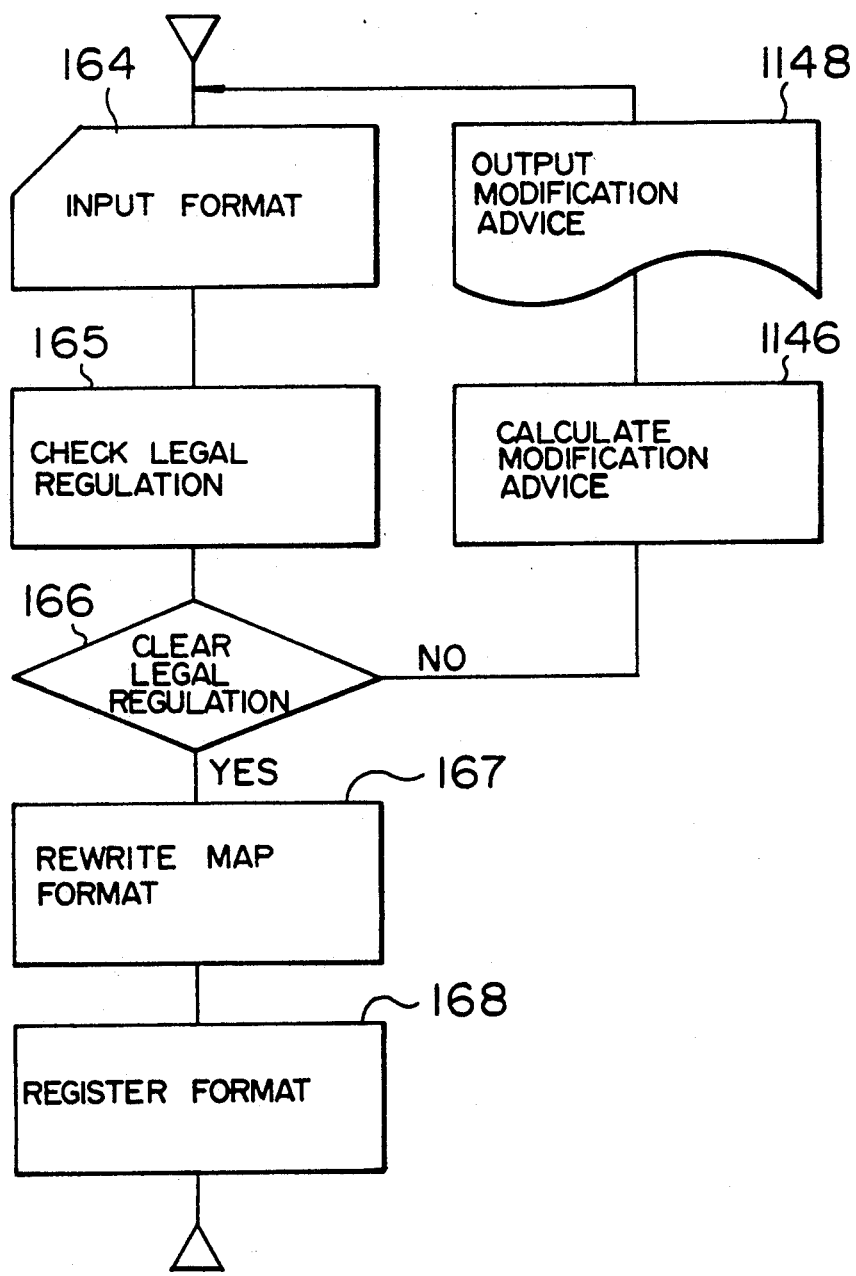
FIG. 37 is a flow chart.

FIG. 37 is a flow chart for use in the inputting operation of the format, the inputting operation of the format being performed by way of menu selection. This embodiment is characterized in its structure provided with a function for checking the legal regulation such as the regulation of exhaust gas, the function being arranged to act at the time of changing the characteristics of the engine. As a result, if the changed characteristics do not meet the legal regulation, data to be input is subjected to the modification.

Then, a flow chart shown in FIG. 37 will be described. First, a format input 164 is conducted, and the checking of the regulation of exhaust gas is conducted in accordance with the legal regulation check 165. The checking of exhaust gas is arranged to conduct the evaluation of exhaust gases CO, HC, NOx and the like due to the determination of the air/fuel ratio and the ignition timing in each of the driving regions. The simplest inspection can be conducted by evaluating as the legal incongruent if the characteristics exceed the allowable limit for the air/fuel ratio or the same of the ignition timing. If a further detailed evaluation can be made by arranging the characteristics of each of the gases to be a data base and by simulating the driving in accordance with each mode so as to conduct the evaluation.

If the inputted format can not clear a legal regulation 166, the region in the map which is incongruent in the legal regulation is subjected to a recommended modification calculation 166 so as to display a modified address output 167 on a CRT of the instrument panel in the compartment of the automobile. As a result, the driver of the automobile is urged to again conduct the format input 164.

If it is determined in the legal regulation clear 166 that the legal regulation is cleared, the individual air/fuel ratio map 159 and the ignition timing 162 are rewritten in Step 167. The maps comprise RAMs (Random Access Memory), where the initial value is arranged to be "0". Then, the thus determined format, that is, the value of each of the two maps (the air/fuel ratio and the ignition timing) is registered as the individual file. The contents of registration of the format 168 can be optionally selected to be registered or not to be registered. The files are arranged to be named. As the recording medium, a sub-storage device of the input device is utilized, the recording medium being exemplified by a floppy disk, hard disk, bubble memory, RAM, and ROM.

An example of the output from the device for inputting the format to be determined is shown in FIG. 38. According to this embodiment, an individual characteristics determination 169 is conducted. According to this embodiment, there are three types in the menu for the input, namely, a friendly menu, a semiprofessional menu, and a professional menu. If the friendly menu is selected, a friendly menu display 171 shown in FIG. 40 is displayed. In accordance with the state of mind of the driver or the desire, the air/fuel ratio and the ignition timing are determined. In order to correspond to the thus inputted determined factors, a pattern (air/fuel ratio and the ignition timing) map is previously programmed so as to be determined.

In a case where the semiprofessional menu is selected, a display 170 shown in FIG. 39 is displayed so as to be selected by the driver of the automobile. Similarly to the friendly menu, a pattern of the air/fuel ratio and the ignition timing maps corresponding to the selected factor are programmed so as to be determined.

Figure 41:
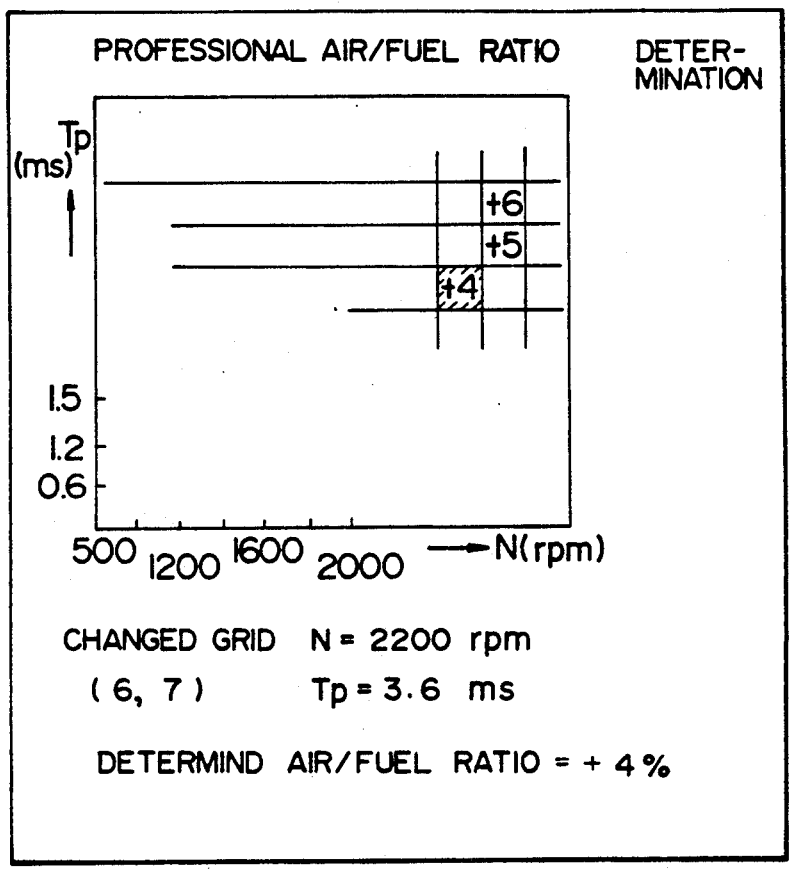
Figure 42:
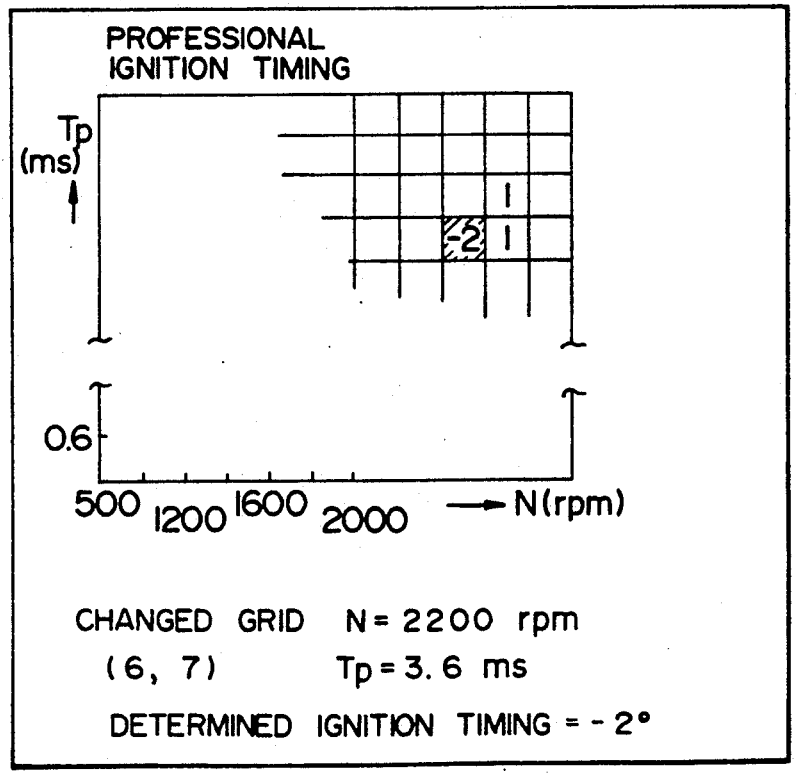

In a case where the professional menu is selected, a display shown in FIG. 41 is produced, and then a display shown in FIG. 42 is produced so that the elements for each of the maps can be determined. Since there is a possibility in which the regulation of exhaust gas cannot be cleared in these cases, the legal regulation checking shown in FIG. 38 needs to be conducted.

According to this embodiment, the determined individual engine performance for each of the drivers can be subjected to the legal checking and the thus inputted format can be used again. Therefore, the characteristics for driving of the automobile can be made meet the desire of the user.

Figure 43:
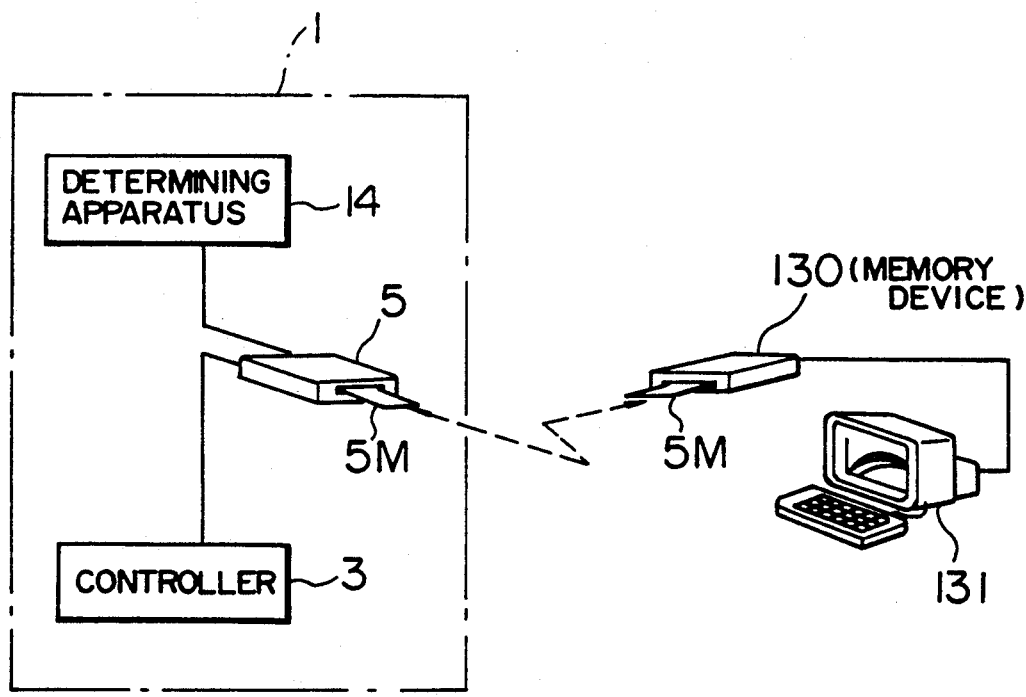
FIG. 43 is a view which illustrates the other embodiment of the present invention.

Although description has been made about the case in which the contents of the sub-memory 5 are determined in the automobile 1, a means for inputting the contents with a determining apparatus disposed outside the automobile 1 will be described with reference to FIG. 43, the means being exemplified by a CD, IC card, MT (Magnet Tape), DAT, and floppy disk. For example, a structure arranged such that a medium 5M is set to a memory device 130 connected to a personal computer 131 so as to the control variable for the automobile can be determined from the personal computer 131. In this case, the same software as that for use in the determining apparatus 14 of the automobile 1 is processed so as to be executed in the personal computer 131.

According to the present invention, the relationship between the amount of operation (input) conducted by the driver of the automobile and the response of the automobile (control variable) can be selected by the driver. Furthermore, the individual characteristics for each of the drivers can be inputted to individual memories for each of the drivers so as to be available. Consequently, the operation of the automobile can be characterized to an individual driver.

What is claimed is:

1. An apparatus for determining control characteristics for control of a driving operation, including at least one of engine speed, steering force and braking force, of an automobile, comprising:

(a) controlled state changing means for changing a controlled state affecting said driving operation of the automobile;

(b) storage means in which characteristics representing driving characteristics desired by the driver of the automobile are stored as correction signal values; and (c) control-signal generating means for generating a control signal providing a control factor representing driving characteristics indicated by the correction signal values stored in said storage means, said control signal being applied to said controlled state changing means for use in determining the driving operation of the automobile.

2. An apparatus for determining control characteristics for control of a driving operation, including at least one of engine speed, steering force and braking force, of an automobile, comprising:

(a) means for detecting a condition, which is directly or indirectly changed for the purpose of controlling the driving operation of the automobile, to produce a condition signal;

(b) storage means for storing at least one correction signal representing driving characteristics desired by the driver of the automobile; and (c) control means responsive to operation by the driver for generating a control signal with which an automobile driving operation is controlled by using the condition signal supplied from said detecting means or by using said condition signal modified by said correction signal representing the driving characteristics supplied from said storage means.

3. An apparatus for determining control characteristics for control of a driving operation, including at least one of engine speed, steering force and braking force, of an automobile, comprising:

(a) controlled state adjusting means operated by the driver of the automobile for adjusting a controlled state in the driving operation of the automobile;

(b) detecting means for detecting an amount of the operation by the driver of said controlled state adjusting means and for generating a control signal representing the detected operation amount;

(c) control means for controlling said driving operation of the automobile in accordance with the control signal generated by said detecting means;

(d) controlled state changing means capable of changing of the driving state of the automobile in accordance with the control supplied from said control means; and (e) storage means for storing correction values which represent driving characteristics desired by the driver of the automobile, including means for supplying said correction values to the control means to modify said control signal for control of said driving operation.

4. An apparatus for determining control characteristics for automobiles comprising:

(a) operation state detection means capable of detecting a state of operation of an internal combustion engine;

(b) control means for generating a basic control signal representing a quantity of control of the internal combustion engine in accordance with the output from said operation state detection means;

(c) storage means for storing a correction value which represents driver's characteristics desired by a driver of the automobile; and (d) adjusting means for adjusting the basic control signal supplied from said control means in accordance with the correction value in said storage means to produce a final control signal for control of the operation of the internal combustion engine.

5. An apparatus for determining control characteristics for automobiles comprising:

(a) controlled state changing means capable of changing the controlled state of the automobile;

(b) storage means capable of storing the driver's characteristics desired by a driver of the automobile;

(c) characteristics selection means with which the driver's characteristics stored in said storage means is made to be selected by the driver of the automobile; and (d) control-signal generating means capable of generating a control signal determined by a control factor of the driver's characteristics stored in said storage means, said control signal being generated for the purpose of controlling said controlled state changing means.

6. An apparatus for determining control characteristics for automobiles, comprising:

(a) controlled state changing means capable of changing engine speed of an internal combustion engine of the automobile;

(b) storage means capable of storing driver's characteristics desired by a driver of the automobile relating to engine speed;

(c) characteristics determining means with which the driver's characteristics stored in said storage means can be selected by the driver of the automobile; and (d) control-signal generating means for generating a basic control signal and a correction signal determined by the driver's characteristics selected from said storage means and for modifying said basic control signal with said correction signal for the purpose of controlling said controlled state changing means.

7. A system of determining characteristics for use in an apparatus for determining control characteristics, including at least one of engine speed, steering force and braking force, of an automobile, said system comprising:

(a) controlled state changing means capable of changing a controlled state of the automobile;

(b) storage means in which at least one correction signal representing driver's characteristics desired by a driver of the automobile are stored; and (c) control-signal generating means capable of generating a control signal said storage means, said control signal being generated for the purpose of controlling said controlled state changing means, said storage means being arranged to store the driver's characteristics by conducting the steps of:

(d) a determining step in which the desired characteristics are determined upon a selection made from a selection menu displayed on a display;

(e) a checking step in which a fact of whether the characteristics determined in said determining step agree with the predetermined checking characteristics or not is checked;

(f) a rewriting step in which the characteristics determined previously are rewritten into the current characteristics in a case where the characteristics determined in the previous checking step agree with the checking characteristics; and (g) a registration step in which newly determined characteristics are registered after the completion of said rewriting step.

8. An apparatus for controlling the driving operation of a motor vehicle according to a desired characteristic specified by a driver, comprising:

an input device operated by a driver of the motor vehicle to control a driving operation of the motor vehicle, said input device including means for producing an operation signal representing a degree of operation of the input device by the driver;

storage means for storing correction signal values representing a driving characteristic for control of said driving operation according to desires of the driver; and a controller connected to receive said correcting signal values stored in said storage means for modifying said operation signal produced by said input device using said correction signal values and for controlling said driving operation of the motor vehicle in response to the modified operation signal to control the motor vehicle on the basis of the degree of operation of the input device by the driver and the driving characteristic desired by the driver as stored in said storage means.

9. An apparatus for controlling the driving operation of a motor vehicle according to a desired characteristic specified by a driver, comprising:

an input device operated by a driver of the motor vehicle to control a driving operation of the motor vehicle, said input device including means for producing an operation signal representing a degree of operation of the input device by the driver;

storage means for storing signal values representing a driving characteristic for control of said driving operation according to desires of the driver; and a controller connected to receive said signal values stored in said storage means and said operation signal produced by said input device for controlling said driving operation of the motor vehicle in response to the degree of operation of the input device by the driver and the driving characteristic desired by the driver as stored in said storage means, wherein said input device includes an accelerator pedal operated by the driver to determine the speed of the motor vehicle, and said signal values for respective values of the rate of change of movement of said accelerator pedal.

10. An apparatus according to claim 9, wherein said controller includes means responsive to correction coefficient values obtained from said storage means for generating a fuel injection control signal.

11. An apparatus according to claim 9, wherein said storage means stores a plurality of sets of signal values, each set representing a different driving characteristic for control of said driving operation, and further including selection means operated by said driver for selecting one of said sets of signal values to be received by said controller according to the desire of the driver.

12. An apparatus for controlling the driving operation of a motor vehicle according to a desired characteristic specified by a driver, comprising:

an input device operated by a driver of the motor vehicle to control a driving operation of the motor vehicle, said input device including means for producing an operation signal representing a degree of operation of the input device by the driver;

storage means for storing signal values representing a driving characteristic for control of said driving operation according to desires of the driver; and a controller connected to receive said signal values stored in said storage means and said operation signal produced by said input device for controlling said driving operation of the motor vehicle in response to the degree of operation of the input device by the driver and the driving characteristic desired by the driver as stored in said storage means, wherein said input device includes a steering wheel operated by the driver to determine the direction of the motor vehicle, and said signal values stored in said storage means comprise the value of steering force to be applied to wheels of the motor vehicle for respective values of operating force applied to the steering wheel.

13. An apparatus according to claim 12, wherein said means for producing an operation signal in said input device comprises a sensor for producing a signal representing the operating force applied to the steering wheel.

14. An apparatus according to claim 12, wherein said storage means stores a plurality of sets of signal values, each set representing a different driving characteristic for control of said driving operation, and further including selection means operated by said driver for selecting one of said sets of signal values to be received by said controller according to the desire of the driver.

15. An apparatus for controlling the driving operation of a motor vehicle according to a desired characteristic specified by a driver, comprising:

an input device operated by a driver of the motor vehicle to control a driving operation of the motor vehicle, said input device including means for producing an operation signal representing a degree of operation of the input device by the driver;

storage means for storing signal values representing a driving characteristic for control of said driving operation according to desires of the driver; and a controller connected to receive said signal values stored in said storage means and said operation signal produced by said input device for controlling said driving operation of the motor vehicle in response to the degree of operation of the input device by the driver and the driving characteristic desired by the driver as stored in said storage means, wherein said input device includes a brake pedal operated by the driver to control the braking force applied to the wheels of the motor vehicle, said signal values stored in said storage means comprise values of braking force to be applied to wheels of the motor vehicle for respective values of force applied to said brake pedal by the driver, and said controller comprises a power brake system for controlling the braking force applied to the wheels.

16. An apparatus according to claim 15, wherein said storage means stores a plurality of sets of signal values, each set representing a different driving characteristic for control of said driving operation, and further including selection means operated by said driver for selecting one of said sets of signal values to be received by said controller according to the desire of the driver.

17. An apparatus for controlling the driving operation of a motor vehicle according to a desired characteristic specified by a driver, comprising:

an input device operated by a driver of the motor vehicle to control a driving operation of the motor vehicle, said input device including means for producing an operation signal representing a degree of operation of the input device by the driver;

storage means for storing signal values representing a driving characteristic for control of said driving operation according to desires of the driver; and a controller connected to receive said signal values stored in said storage means and said operation signal produced by said input device for controlling said driving operation of the motor vehicle in response to the degree of operation of the input device by the driver and the driving characteristic desired by the driver as stored in said storage means, wherein said input device includes an accelerator pedal operated by the driver to determine the speed of the motor vehicle, said signal values stored in said storage means comprise a map of values representing shifting points between gears in an automatic transmission for respective values of vehicle speed and degree of movement of the accelerator pedal, and said controller comprises means for controlling and shifting of gears in said automatic transmission.

18. An apparatus according to claim 17, wherein said storage means stores a plurality of sets of signal values, each set representing a different driving characteristic for control of said driving operation, and further including selection means operated by said driver for selecting one of said sets of signal values to be received by said controller according to the desire of the driver.

19. An apparatus for controlling the driving operation of a motor vehicle according to a desired characteristic specified by a driver, comprising:

an input device operated by a driver of the motor vehicle to control a driving operation of the motor vehicle, said input device including means for producing an operation signal representing a degree of operation of the input device by the driver;

storage means for storing signal values representing a driving characteristic for control of said driving operation according to desires of the driver; and a controller connected to receive said signal values stored in said storage means and said operation signal produced by said input device for controlling said driving operation of the motor vehicle in response to the degree of operation of the input device by the driver and the driving characteristic desired by the driver as stored in said storage means, wherein said storage means stores a plurality of sets of signal values, each set representing a different driving characteristic for control of said driving operation, and further including selection means operated by said driver for selecting one of said sets of signal values to be received by said controller according to the desire of the driver.

20. An apparatus according to claim 19, wherein said selection means includes a display device for displaying data representing said different driving characteristics and a selector apparatus operable by the driver for selecting one of said sets of data values relating to a driving characteristic displayed by said display device.

* * * * *